(12) United States Patent
Flake et al.

(10) Patent No.: US 6,584,114 B1
(45) Date of Patent: Jun. 24, 2003

(54) CONTROL OF THE CHANGE OF TELECOMMUNICATIONS CHANNELS IN A DECT-SPECIFIC RLL/WLL PARTIAL SYSTEM BOUND TO AN ISDN-SYSTEM

(75) Inventors: Horst Flake, Oberhaching (DE); Martin Kordsmeyer, Hörstel (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/155,379

(22) PCT Filed: Apr. 3, 1997

(86) PCT No.: PCT/DE97/00689

§ 371 (c)(1),
(2), (4) Date: Sep. 28, 1998

(87) PCT Pub. No.: WO97/38546

PCT Pub. Date: Oct. 16, 1997

(30) Foreign Application Priority Data

Apr. 4, 1996 (DE) .......................... 196 13 636
Jun. 24, 1996 (DE) .......................... 196 25 141

(51) Int. Cl.[7] .............. H04B 7/216; H04J 3/16
(52) U.S. Cl. ........................ 370/437; 370/441
(58) Field of Search ................ 370/335, 336, 370/341, 342–344, 347, 437, 439, 441–443

(56) References Cited

U.S. PATENT DOCUMENTS

| 4,888,766 A | * | 12/1989 | Ogasawara ................ 370/95.1 |
| 5,181,199 A | * | 1/1993 | Motoki et al. .............. 370/60 |
| 5,212,684 A | * | 5/1993 | MacNamee et al. ......... 370/24 |
| 5,781,623 A | * | 7/1998 | Khakzar .................. 379/230 |
| 5,799,010 A | * | 8/1998 | Lomp et al. ............... 370/335 |

FOREIGN PATENT DOCUMENTS

WO    WO 95/33348    * 12/1995    ............ H04Q/7/24

* cited by examiner

*Primary Examiner*—Alpus H. Hsu
*Assistant Examiner*—Toan Nguyen
(74) *Attorney, Agent, or Firm*—Bell, Boyd & Lloyd LLC

(57) ABSTRACT

To control the change, necessitated by the transmission of system information in the local information transmission loop, from a telecommunication channel—e.g. the $C_f$ channel defined in the DECT standard—to a telecommunication channel—e.g. the $C_s$ channel defined in the DECT standard, in a telecommunication subsystem which is tied into a telecommunication system as local information transmission loop—particularly a DECT-specific RLL/WLL subsystem tied into an ISDN system, the changing of channels is preferably initiated and performed by a time-limited interruption of the transmission of information in the telecommunication subsystem and subsequent resumption of the transmission of information.

30 Claims, 15 Drawing Sheets

CONTROL OF THE CHANGE OF TELECOMMUNICATIONS CHANNELS IN A DECT-SPECIFIC RLL/WLL PARTIAL SYSTEM BOUND TO AN ISDN-SYSTEM

BACKGROUND OF THE INVENTION

In communication systems comprising an information transmission link between an information source and an information sink, transmitting and receiving devices are used for information processing and transmission, in which devices 1) the information processing and information transmission can take place in a preferred direction of transmission (simplex mode) or in both directions of transmission (duplex mode),
2) the information processing is analog or digital,
3) the information transmission over the long-distance transmission link is wire-connected or takes place wirelessly on the basis of various FDMA (Frequency Division Multiple Access), TDMA (Time Division Multiple Access) and/or CDMA (Code Division Multiple Access) information transmission methods—e.g. according to radio standards such as DECT, GSM, WACS or PACS, IS-54, PHS, PDC etc. [Compare IEEE Communications Magazine, January 1995, pages 50 to 57; D. D. Falconer et al.: "Time Division Multiple Access Methods for Wireless Personal Communications"].

"Information" is a generic term which stands both for the intelligence (information) and for the physical representation (signal). Even if an information contains the same intelligence—i.e. has the same information content—different signal forms can occur. Thus, an information relating to an object, e.g., can be transmitted (1) in the form of an image,
(2) as a spoken word,
(3) as a written word,
(4) as a coded word or image.

In this connection, the type of transmission according to (1) . . . (3) is normally characterized by continuous (analog) signals whilst discontinuous signals (e.g. pulses, digital signals) are usually produced in the case of the type of transmission according to (4).

Based on this general definition of a communication system, the invention relates to a method for controlling the changing of telecommunication channels of a telecommunication subsystem tied into a telecommunication system as local information transmission loop—particularly of a DECT—specific RLL/WLL subsystem (Radio Local Loop) Wireless Local Loop) tied into an ISDN system—according to the precharacterizing clause of claim 1.

FIG. 1 shows on the basis of the printed documents "Nachrichtentechnik Elektronik, Berlin 45 (1995) Vol. 1, pages 21 to 23 and Vol. 3 pages 29 and 30" and IEE Colloquium 1993, 173; (1993), pages 29/1–29/7; W. Hing, F. Halsall: "Cordless access to the ISDN basic rate service" on the basis of a DECT/ISDN Intermediate System DIIS according to ETSI Publication prETS 300xxx, Version 1.10, September 1996, an "ISDN-to-DECT-specific RLL/WLL" telecommunication system IDRW-TS (Integrated Services Digital Network-to-Radio in the Local Loop/Wireless in the Local Loop) with an ISDN telecommunication subsystem I-TTS [compare printed document "Nachrichtentechnik Elektronik, Berlin 41–43, Part: 1 to 10, P1: (1991) Vol. 3, pages 99 to 102; P2: (1991) Vol. 4, pages 138 to 143; P3: (1991) Vol. 5, pages 179 to 182 and Vol. 6, pages 219 to 220; P4: (1991) Vol. 6, pages 220 to 222 and (1992) Vol. 1, pages 19 to 20; P5: (1992) Vol. 2, pages 59 to 62 and (1992) Vol. 3, pages 99 to 102; P6: (1992) Vol. 4, pages 150 to 153; P7: (1992) Vol. 6, pages 238 to 241; P8: (1993) Vol. 1, pages 29 to 33; P9: (1993) Vol. 2, pages 95 to 97 and (1993) Vol. 3, pages 129 to 135; P10: (1993) Vol. 4, pages 187 to 190"] and a DECT-specific RLL/WLL telecommunication subsystem RW-TTS.

In this arrangement, the DECT/ISDN intermediate system DIIS and, respectively, the RLL/WLL telecommunication subsystem RW-TTS are preferably based on a DECT [Digital Enhanced (previously European) Cordless Telecommunication/GAP system DGS; compare (1): Nachrichtentechnik Elektronik 42 (1992) January/February No. 1, Berlin, DE; U. Pilger "Struktur des DECT-Standards" (Structure of the DECT standard), pages 23 to 29 in conjunction with ETSI Publication ETS 300175-1 . . . 9, October 1992; (2): Telcom Report 16 (1993), No. 1, J. H. Koch: "Digitaler Komfort für schnurlose Telekommunikation—DECT-Standard eröffnet neue Nutzungsgebiete" (Digital comfort for cordless telecommunication—DECT standard opens up new fields of application), pages 26 and 27; (3): tec 2/93—The technical magazine by Ascom "Wege zur universellen mobilen Telekommunikation" (Approaches to a universal mobile telecommunication), pages 35 to 42; (4): Philips Telecommunication Review Vol. 49, No. 3, September 1991, R. J. Mulder: "DECT, a universal cordless access system"; (5): WO 93/21719 (FIGS. 1 to 3 and associated description)]. The GAP (Generic Access Profile) standard is a subset of the DECT standard which has the task of ensuring the interoperability of the DECT air interface for telephone applications (compare ETSI Publication prETS 300444 April 1995).

As an alternative, the DECT/ISDN intermediate system DIIS and, respectively the RLL/WLL telecommunication subsystem RW-TTS, can also be based on a GSM system (Groupe Spéciale Mobile or Global System for Mobile Communication; compare Informatik Spektrum 14 (1991) June, No. 3, Berlin, DE; A. Mann: "Der GSM-Standard-Grundlage für digitale europäische Mobilfunknetze" (The GSM standard—basis for digital European mobile radio networks), pages 137 to 152). In the context of a hybrid telecommunication system it is also possible, instead, for the ISDN telecommunication subsystem I-TTS to be constructed as GSM system.

In addition, further possibilities to be considered for implementing the DECT/ISDN intermediate system DIIS and, respectively, the RLL/WLL telecommunication subsystem RW-TTS or the ISDN telecommunication subsystem I-TTS are the systems mentioned initially, and future systems which are based on the known multiple-access methods FDMA, TDMA, CDMA (Frequency Division Multiple Access, Time Division Multiple Access, Code Division Multiple Access) and hybrid multiple access methods formed from these.

The use of radio channels (e.g. DECT channels) in traditional line-connected telecommunication systems such as the ISDN is gaining increasing significance, particularly against the background of future alternative network operators without their own complete wire-line network.

Thus, it is intended to provide the ISDN subscriber with ISDN services at standard ISDN interfaces by means of the wireless RLL/WLL (Radio in the Local Loop/Wireless in the Local Loop) line interfacing system, e.g. including the DECT system DS, for example in the RLL/WLL telecommunication subsystem RW-TTS (compare FIG. 1).

In the "ISDN-to-DECT-specific RLL/WLL" telecommunication system IDRW-TS according to FIG. 1, a telecommunication subscriber (user) TCU (Telecommunication User) with his terminal equipment TE (also Terminal Endpoint) is tied, e.g. via a standardized S interface (S-BUS), the preferably DECT-specific DECT/ISDN intermediate system DIIS (first telecommunication subsystem) contained in the RLL/WLL telecommunication subsystem RW-TTS and constructed as local information transmission loop, a further standardized S interface (S-BUS), a network termination NT and a standardized U interface of the ISDN telecommunication subsystem I-TTS (second telecommunication subsystem) into the ISDN world and all the services available therein.

The first telecommunication subsystem DIIS essentially consists of two telecommunication interfaces, a first telecommunication interface DIFS (DECT Intermediate Fixed System) and a second telecommunication interface DIPS (DECT Intermediate Portable System) which are connected to one another wirelessly, e.g. via a DECT air interface. Because of the quasi-stationary first telecommunication interface DIFS, the first telecommunication subsystem DIIS forms the local information transmission loop defined above in this connection. The first telecommunication interface DIFS contains a radio fixed part RFP, an interworking unit IWU1 and an interface circuit INC1 to the S interface. The second telecommunication interface DIPS contains a radio portable part RPP and an interworking unit IWU2 and an interface circuit INC2 to the S interface. In this arrangement, the radio fixed part RFP and the radio portable part RPP form the familiar DECT/GAP system DGS.

To have a DECT-specific RLL system as bearer for all ISDN services, if possible, in the subscriber loop, the following general problems arise:

a) formulation of the ISDN channel structure (D channel and 2 B channels), especially of the D channel in the text which follows, b) good economy of bandwidths; particularly significant for ISDN since some services already need two DECT channels for the B channel data rate of 64 kb/s, c) minimum technical complexity.

Simulation of the D Channel
Properties of the D Channel

Common signalling channel on the C plane for all terminal endpoints TE connected to the ISDN line.

The TE-specific signalling channels to the network are separated there by TE-individual addresses TEI (Terminal Endpoint. Identifiers). The order of information is in short TE-individually by the access mechanism to the D channel.

Throughput: 16 kb/s

Usage: depends on many criteria, as a rule lower than maximum capacity; congestion situations are possible but can be, rapidly cleared because of the high capacity.

DECT Channels

FIG. 2 shows the TDMA structure of the DECT/GAP system TKS in accordance with the printed document "Nachrichtentechnik Elektronik 42 (1992) January/February, No. 1, Berlin, DE; U. Pilger: "Struktur des DECT-Standards" (Structure of the DECT standard), pages 23 to 29 in conjunction with ETS 300 175-1 . . . 9, October 1992". With respect to the multiple access methods, the DECT/GAP system is a hybrid system in which radio messages can be sent on ten frequencies in the frequency band between 1.88 and 1.90 GHz according to the FDMA principle within a predetermined time sequence according to the TDMA principle according to FIG. 2 from the base station RFP to the mobile part RPP and from the mobile part RPP to the base station RFP (duplex mode). The time sequence is determined by a multi-timeframe MZR which occurs every 160 ms and which has 16 timeframes ZR having in each case a duration of 10 ms. Within these time frames ZR, information relating to a C, M, N, P, Q channel defined in the DECT standard is transmitted separately to the base station RFP and the mobile part RPP. Thus if information for several of these channels is transmitted within one timeframe, the transmission takes place in accordance with a list of priorities, where M>C>N and P>N. Each of the 16 timeframes ZR of the multi-timeframe MZR is, in turn, subdivided into 24 time slots ZS having in each case a duration of 417 $\mu$s, of which 12 time slots ZS (time slots $0 \ldots 11$) are intended for the "base station RFP→mobile part RPP" direction of transmission and a further 12 time slots ZS (time slots $12 \ldots 23$) are intended for the "mobile part RPP→base station RFP" direction of transmission. In each of these time slots ZS, information having a bit length of 480 bits are transmitted in accordance with the DECT standard. Of these 480 bits, 32 bits are transmitted as synchronization information in a SYNC field and 388 bits are transmitted as user information in a D field. The remaining 60 bits are transmitted as additional information in a Z field and as guard information in a "guard time" field. The 388 bits of the D field, transmitted as user information, are, in turn, subdivided into a 64-bit-long A field, a 320-bit-long B field and a 4-bit-long "X-CRC" word. The 64-bit-long A field is composed of a header with a length of 8 bits, a data record with data for the C, Q, M, N, P channels with a length of 40 bits and an "A-CRC" word with a length of 16 bits.

Properites

Use of TDMA time slots.

In principle, one $C_s$ channel (s=slow) is used for signalling [C plane in the DECT standard] and an associated channel is used for the user information [U Plane in the DECT standard] (32 kb/s throughput).

Throughput of the $C_s$ channel: 2 kb/s.

The DECT standard also offers other channel structures, e.g. a $C_f$ channel (f=fast).

The $C_f$ channel occupies one time slot.

Throughput of the $C_f$ channel: 25.6 kb/s.

Based on the OSI/ISO reference model [compare (1): Unterrichtsblätter (Training sheets) Deutsche Telecom Vol. 48, 2/1995, pages 102 to 111; (2): ETSI Publication ETS 300175—1 . . . 9, October 1992; (3): ETSI Publication ETS 300102, February 1992; (4): ETSI Publication ETS 300125, September 1991; (5): ETSI Publication ETS 300012, April 1992], FIG. 3 shows a model of the C plane of the "ISDN-to-DECT-specific RLL/WLL" telecommunication system IDRW-TS according to FIG. 1.

Based on the OSI/ISO reference model [compare (1): Unterrichtsblätter (Training sheets) Deutsche Telecom Vol. 48, February/1995, pages 102 to 111; (2): ETSI Publication ETS 300175—1 . . . 9, October 1992; (3): ETSI Publication ETS 300102, February 1992; (4): ETSI Publication ETS 300125, September 1991; (5): ETSI Publication ETS 300012, April 1992], FIG. 4 shows a model of the U plane for voice data transmission of the "ISDN-to-DECT-specific RLL/WLL" telecommunication system IDRW-TS according to FIG. 1.

Economy of Bandwidths

The $C_s$ channel structure offers optimum economy of bandwidths for a standard voice connection since, according to FIG. 5, on the basis of FIGS. 3 and 4 and taking into consideration the ETSI Publications (ETS 300175-1, October/1992, Section 7; ETS 300175-3, October/1992, Section 4.1; ETS 300175-4 10/1992, Section 4), only one transmission path (bearer)—e.g. MBC with the LCNy, LCN1 according to FIG. 5—or, respectively, one connection or one time slot is needed.

According to FIG. 5 and on the basis of FIGS. 3 and 4 and taking into consideration the ETSI Publications (ETS 300175-1, October/1992, Section 7; ETS 300175-3, October/1992, Section 4.1; ETS 300175-4 October/1992, Section 4), the use of the $C_f$ channel leads to less economy of bandwidths since the U plane itself needs a further transmission path (bearer) or, respectively, a further connection or a further time slot; i.e. two bearers—e.g. MBC with the LCN2, LCNz and MBC with the LCNy, LCN1 according to FIG. 5—or, respectively, two connections or two time slots are needed for a simple voice connection.

Moreover, three bearers—e.g. MBC with the LCNx, LCN0, MBC with the LCNy, LCN1 and MBC with the LCNz, LCN2 according to FIG. 5—or, respectively, three connections or three time slots are required where there are two ISDN B channel connections (voice connections).

Although it appears to be appropriate to use the $C_f$ channel from the point of view of channel capacity, the use of the $C_s$ channel is appropriate from the point of view of economy of bandwidths.

Independently of whether it is the $C_f$ channel or the $C_s$ channel which is used for setting up the connection (setting up bearers), it must be ensured (compare FIG. 5), that it is possible to change from $C_f$ channel to the $C_s$ channel and conversely at any time (changing channels between channels of unequal channel capacity). In addition, it must be ensured that it is possible to change between a first $C_s$ channel and a second $C_s$ channel (changing channels between two channels of equal channel capacity) because of the possibility that the two connections (bearers) can be set up at the same time in the ISDN system (2 B channels).

SUMMARY OF THE INVENTION

The object forming the basis of the invention consists in controlling in a simple manner changes from information usually transmitted in the telecommunication subsystem, in a telecommunication subsystem which is tied into a telecommunication system as local information transmission loops—especially a DECT-specific RLL/WLL subsystem tied into an ISDN system.

Proceeding from controlling the change of channel in a telecommunication subsystem which is tied into a telecommunication system as local information transmission loop—especially a DECT-specific RLL/WLL subsystem tied into an ISDN system—mentioned and outlined initially, by means of two commands, one first command designed as switch-over command and a second command designed as switch-over response, the idea underlying the invention is as follows:

to designationally initiate the channel change;
to provide a time control in conformity with which a further switch-over command is transmitted given failure of the switch-over response to arrive in response to the switch-over command;
the switch-over response confirms that the switching has already been underaken;
to initiate and implement the channel change by means of a time-limited interruption of the information or, respectively, message transmission in the telecommunication system and subsequent resumption of the information, or respectively, message transmission;
for a change of channel from a DECT-specific $C_f$ channel to a DECT-specifice $C_s$ channel, this is preferably done, by means of an ATTRIBUTE_REQUEST information element tied into the DECT protocol as switch-over command and an ATTRIBUTE_CONFIRM information element tied into the DECT protocol as switch-over response or, respectively, by means of a SUSPEND information element tied into the DECT protocol as switch-over command and a RESUME information element tied into the DECT protocol as switch-over response); and
before the transmission of the system information, subsystem-specific parameters prescribed on the other subsystem channel are reset;
after the channel change, a test message with request for acknowledgment is sent;
the information is transmitted according to a predetermined transmission principle with a predetermined transmission sequence and, after a channel change, is transmitted on the other subsystem channel with an optimally small transmission sequence;
system message with payload information and/or the system information and/or the subsystem information are transmitted between the telecommunication interfaces of the telecommunication subsystem on transmission paths with different identifiers.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

FIGS. 6 to 10 show various event/state diagrams which represent possible sequences of the change of telecommunication channels of a telecommunication subsystem tied into a telecommunication system as local information transmission loop, particularly of an RLL/WLL subsystem RW-TTS-DIIS tied into an ISDN system.

Figure 1:
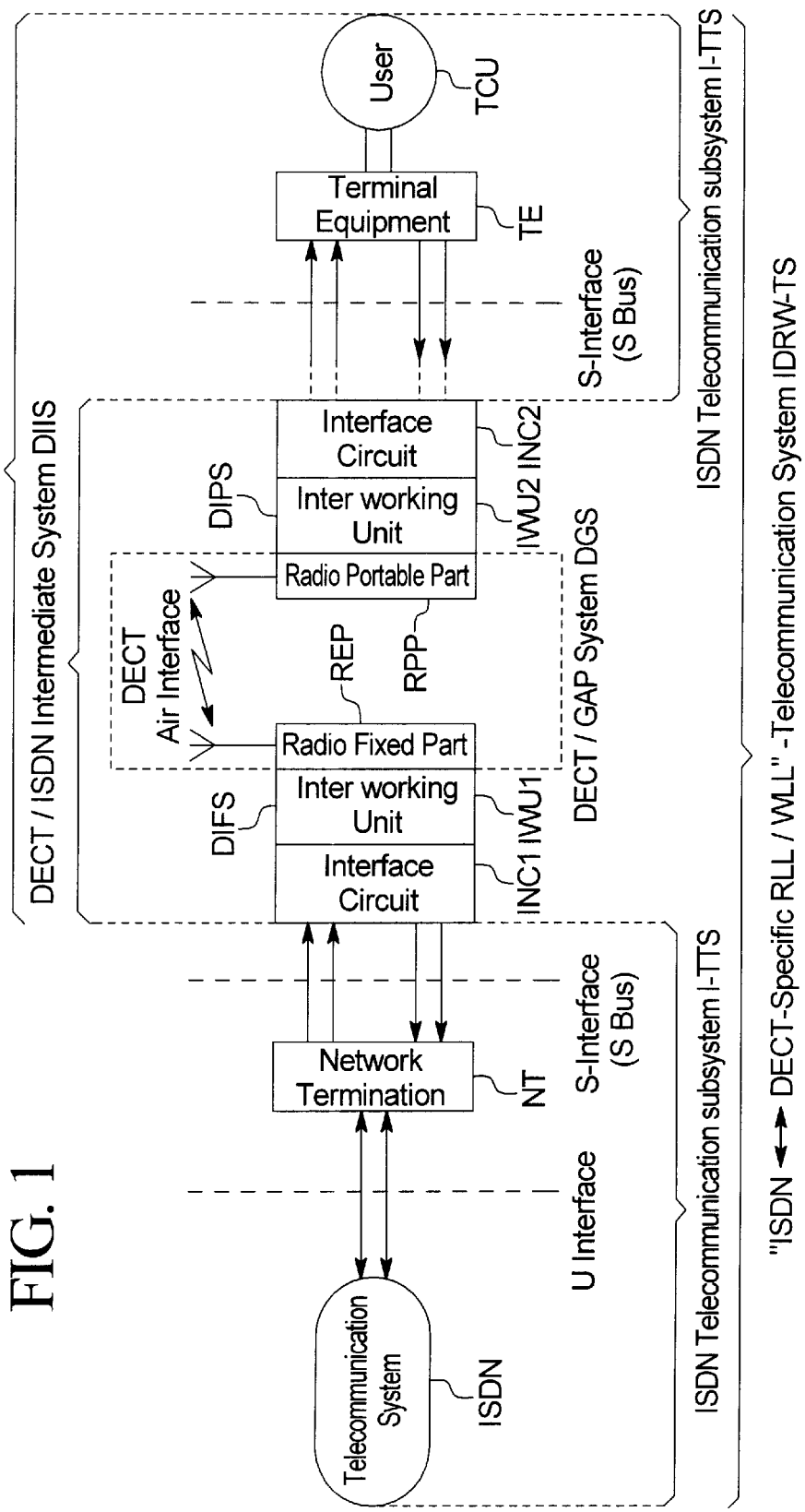
FIG. 1 depicts a prior art telecommunication system.
Figure 2:
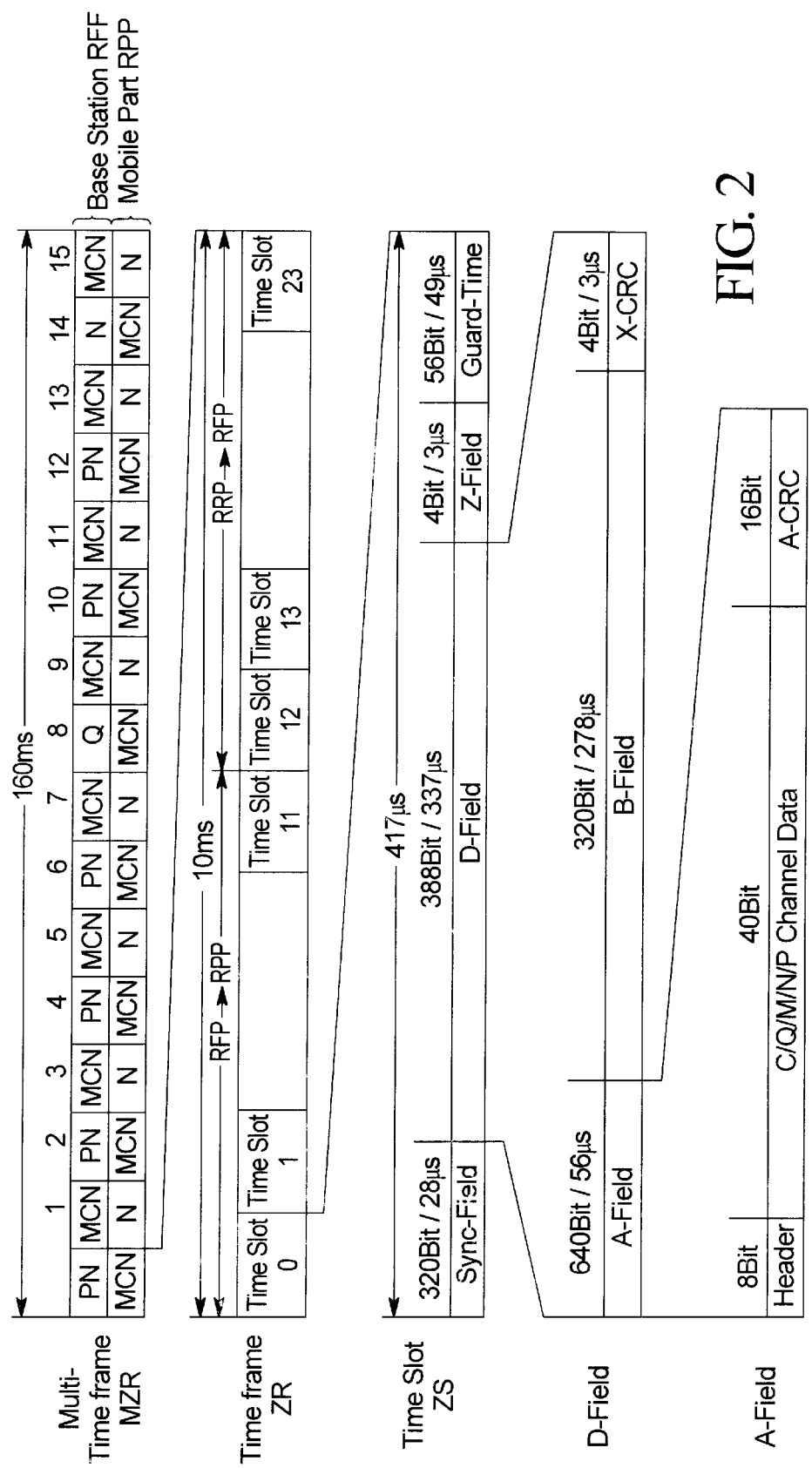
FIG. 2 depicts a TDMA structure of the FIG. 1 system.
Figure 3:
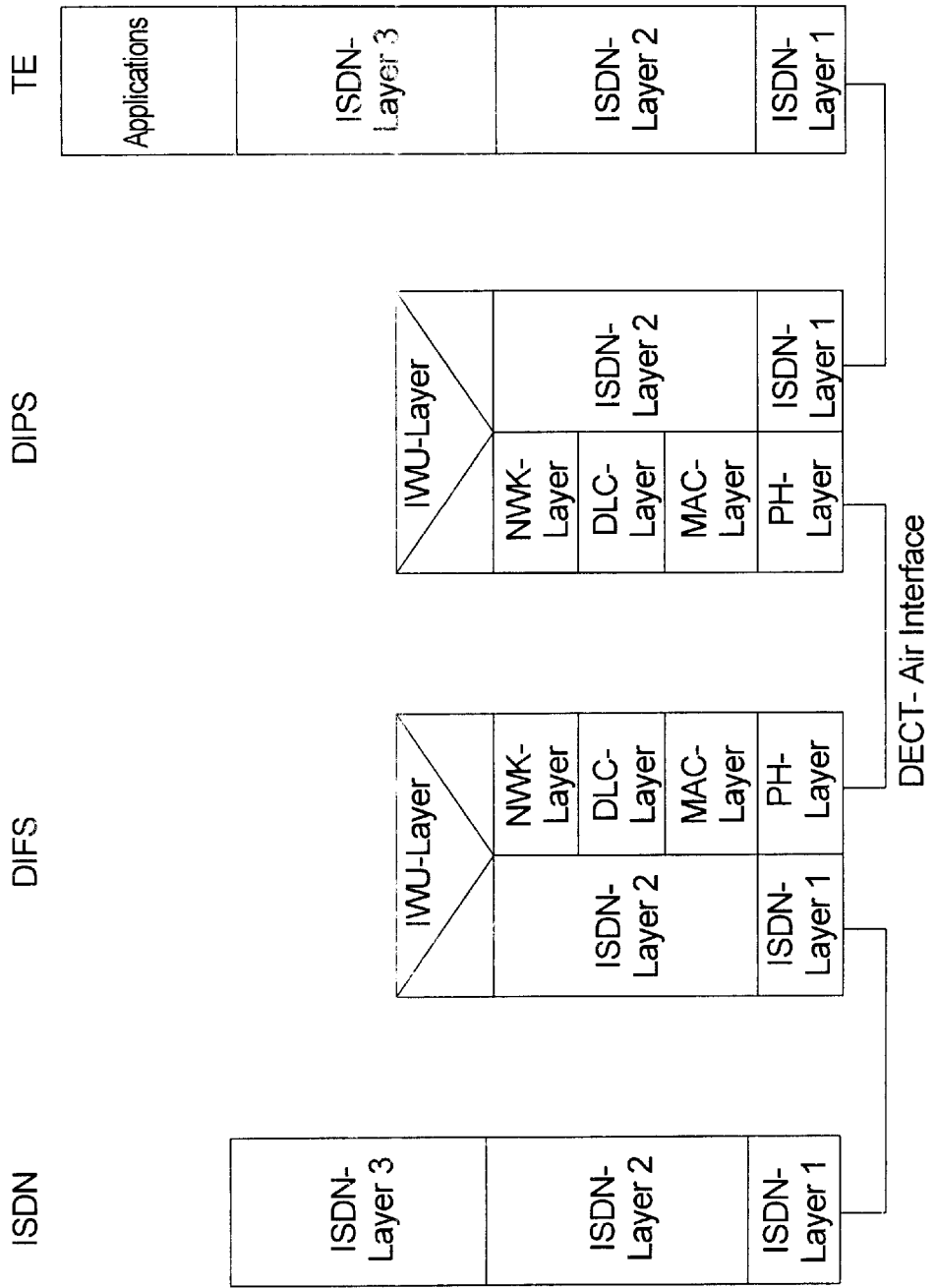
FIG. 3 depicts a model of the C plane of the FIG. 1 system.
Figure 4:
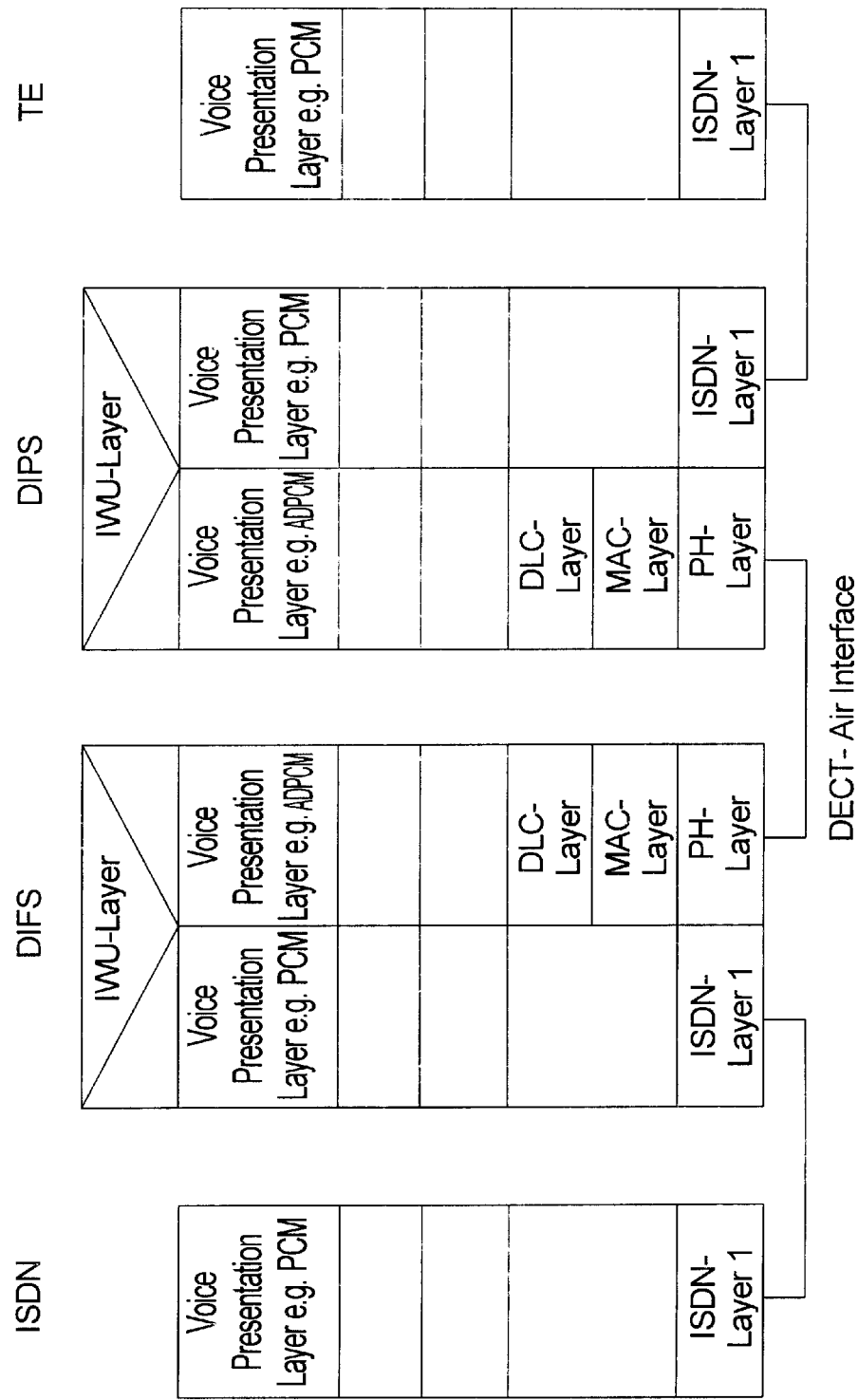
FIG. 4 depicts a model of the U plane for voice data transmission of the FIG. 1 system.
Figure 5:
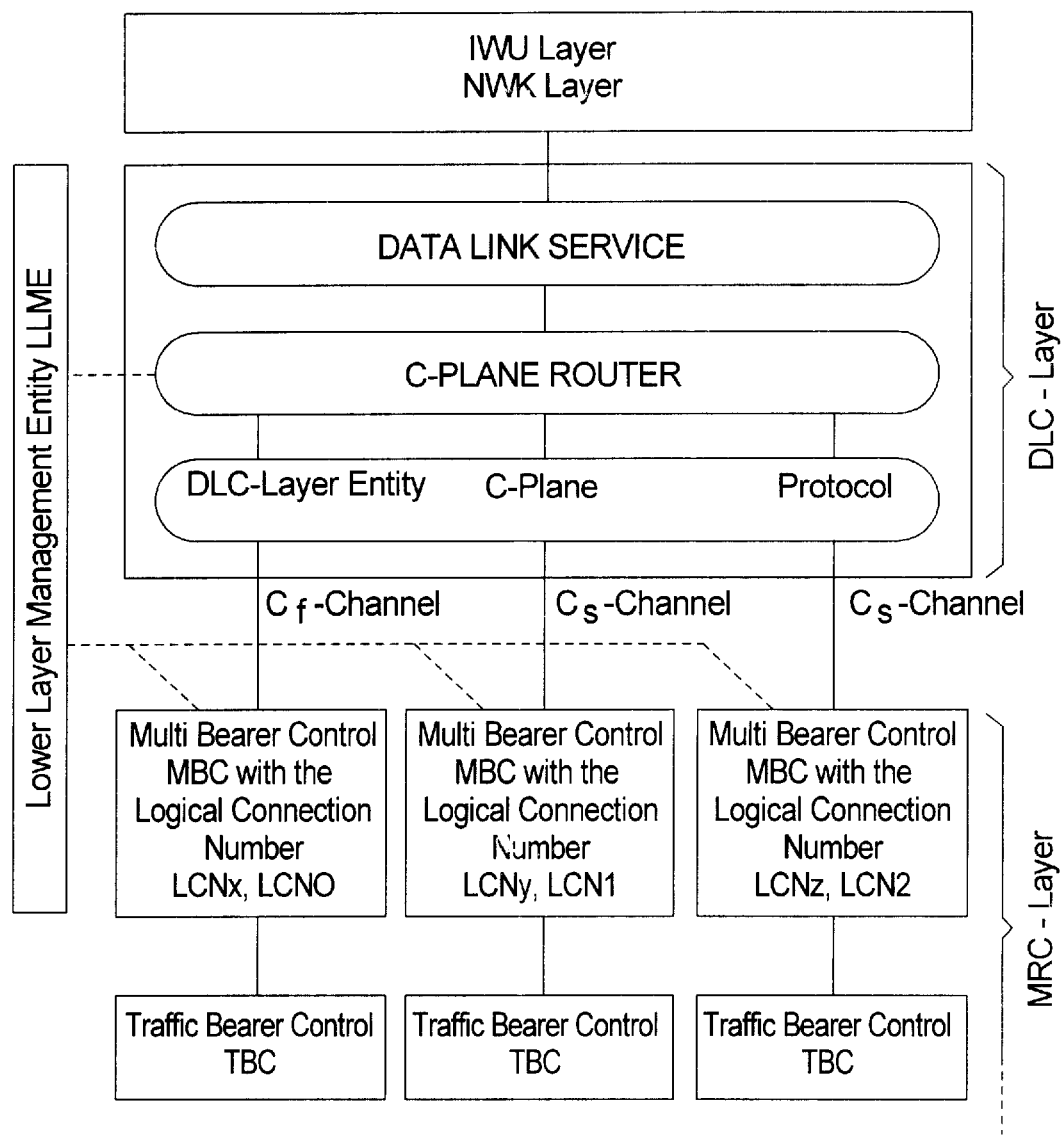
FIG. 5 depicts channel structure of the FIG. 1 system.
Figure 6:
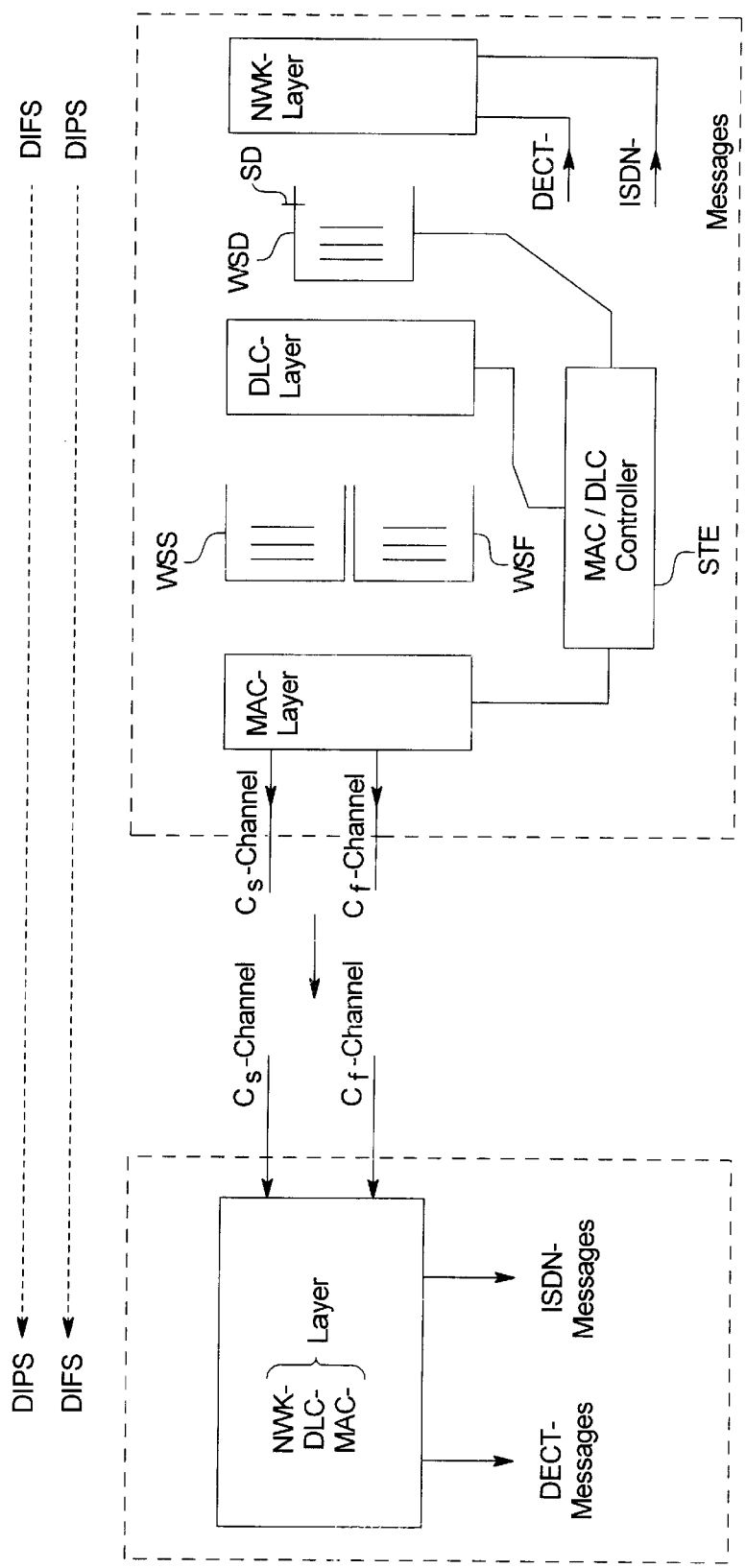
FIG. 6 depicts a configuration of transmitting and receiving sections according to the present invention.

FIG. 6 shows a first event/state diagram which is based on FIGS. 1 to 5 and which represents the basic control sequence for a subsystem channel change.

The first telecommunication interface DIFS is connected on a first bearer having a first logical connection number LCNx by a first subsystem channel $C_x$ to the second telecommunication interface DIPS. In addition, there is a further telecommunication connection between the first telecommunication interface DIFS and the second telecommunication interface DIPS on a second bearer having a second logical connection number LCNy by a second subsystem channel Cy or, as an alternative, a further telecommunication connection can be set up between the first telecommunication interface DIFS and the second telecommunication interface DIPS on a second bearer having a second logical connection number LCNy by a second subsystem channel $C_y$.

In this arrangement, the relation LCNx≠LCNy applies to the logical connection numbers LCNx, LCNy. The first subsystem channel $C_x$ can be constructed as DECT-specific $C_f$ channel or $C_s$ channel. Due to the channel constellations occurring in the DECT-specific telecommunication subsystem RW-TTS,DIIS the second subsystem channel $C_y$ is accordingly a $C_s$ channel or a $C_f$ channel or $C_s$ channel. According to FIG. 6, the first subsystem channel $C_x$ is used for transmitting information on the C plane.

To set up a bearer, a DECT-specific first B-field message "BEARER_REQUEST" (compare ETSI Publication ETS 300175-3, October 1992, Section 7.3.3.2) is sent as command and a DECT-specific second B-field message "BEARER_CONFIRM" (compare ETSI Publication ETS 300175-3, October 1992, Section 7.3.3.3) is sent as RESPONSE (compare ETSI Publication ETS 300175-3, October 1992, Section 10.5.1.1 to 10.5.1.3) in familiar manner. Transmission of the first B-field message "BEARER_REQUEST" is preferably initiated by the second telecommunication interface DIPS in this arrangement (compare FIGS. 9 and 10 and ETSI Publication ETS 300175-3, October 1992, Section 10.5.1.2 and 10.5.1.3).

As a result of the analysis of the ISDN "layer 2/layer 3" messages or, respectively, the amount of information transmitted by these messages (compare printed document "Nachrichtentechnik Elektronik, Berlin 41, P2: (1991) Vol. 4, pages 138 to 143") on the "ISDN network-to-ISDN subscriber (Terminal Endpoint TE) transmission link, the first telecommunication interface DIFS, e.g., recognizes the necessity of initiating a change of channel (change from the first subsystem channel $C_x$ to the second subsystem channel $C_y$). In this arrangement, the result of the analysis forms the stimulus for the change of channel.

For example, a possible first result of this analysis can consist in no messages being transmitted between the first telecommunication interface DIFS and the second telecommunication interface DIPS on the first subsystem channel $C_x$, preferably for a predetermined period of time.

For example, a possible second result of this analysis can consist in two bearers having been set up with in each case one C plane and one U plane and the bearer on which the C plane is being used having to be cleared down; so that, accordingly, a change from the previously active $C_s$ channel to be cleared down to the previously inactive $C_s$ channel becomes necessary.

To minimize the complexity, it is appropriate to concentrate the analysis described above in one of the telecommunication interfaces DIFS, DIPS—e.g. advantageously the first telecommunication interface DIFS and to control the second telecommunication interface DIPS from there [MASTER-SLAVE configuration, in which the first telecommunication interface DIPS is the MASTER and the second telecommunication interface DIPS is the SLAVE]. In this constellation, the first telecommunication interface DIFS always has the possibility of selecting a DECT channel structure corresponding to the ISDN service (C plane and/or U plane).

Instead of the first telecommunication interface DIFS, the second telecommunication interface DIPS can also be provided for this purpose. However, this only works if the latter has direct access to the ISDN layer 3. The second telecommunication interface DIPS is not capable of unambiguously mapping a TE-individual connection with C plane and U plane onto a corresponding DECT channel structure from the ISDN layer 2 function alone.

In the further explanation of the illustrative embodiment, the MASTER-SLAVE configuration described above is used as a basis.

After the first telecommunication interface DIFS has recognized the necessity of a change of channel, it will preferably confirm (answer) all unconfirmed (unanswered) information transmitted and completely received on the first subsystem channel $C_x$ in accordance with the HDLC (High level Data Link Control) protocol, the so-called I frames (information packet), with a DECT-specific first DLC message "RECEIVE_READY" sent as RESPONSE (compare ETSI Publication ETS 300175-4, October 1992, Section 7.11.2), if no further I frame is sent.

In accordance with the HDLC protocol, it is possible, for example, to transmit the information (I frames) in transmission sequences (windows) and to acknowledge each transmission sequence (each window) separately. In the present case, for example, the information is transmitted with a window size of k=3 before an acknowledgement is made. The window size k=3 signifies with respect to the above-mentioned I frames that an acknowledgement of the three frames transmitted previously is made after each third I frame. In general, the following relation applies to the window size k:

$$1 \leq k \leq n$$

where n∈N

Due to the transmission of a first message "SWITCHING_REQUEST", which, for example, can either be defined in the DECT standard (compare MAC message "ATTRIBUTES$_{13}$ T._REQUEST" in FIGS. 7 to 10 according to ETSI Publication ETS 300175-3, October 1992, Section 7.2.5.3.8) or is still to be defined in the latter, the wish by the first telecommunication interface DIFS to transfer the transmission of the system information from the first subsystem channel $C_x$ to the second subsystem channel $C_y$, is conveyed to the second telecommunication interface DIPS. As already mentioned, the wish can have arisen due to stimulation or without any trigger.

As a result of the transmission of this message, the first telecommunication interface DIFS can either—preferably—interrupt its own information transmission on the C plane or continue the transmission of the information on the C plane. Interruption means that the first telecommunication interface DIFS will send no further information for a predetermined period of time. The interruption can occur, for example, before, together with or after the transmission of the message.

In addition, the message can be sent at the I frame boundaries and within one I frame.

On or after receipt of the message "SWITCHING_REQUEST", the second telecommunication interface DIPS will preferably delete all I frames not completely received and it can either interrupt or continue its own information transmission on the C plane like the first telecommunication interface DIFS, on or after receipt of the message "SWITCHING_REQUEST".

In addition, the second telecommunication interface DIPS can confirm (answer) all unconfirmed (unanswered) information transmitted on the first subsystem channel $C_x$ in accordance with the HDLC (High level Data Link Control) protocol and completely received, the so-called I frames, with the DECT-specific first DLC message "RECEIVE_READY" sent as response (compare ETSI Publication ETS 300175-4, October 1992, Section 7.11.2) if its own transmitter is idle.

As an alternative to the direct interruption, it is also possible for the second telecommunication interface DIPS to conclude the transmission of an I frame before the interruption.

The interruption of the information transmission or the continuance of the information transmission on the first subsystem channel $C_x$ by the second telecommunication interface DIPS preferably occurs between the receipt of the first message and before the transmission of a second message "SWITCHING_CONFIRM", which, for example, can again either be defined in the DCT standard (compare MAC message "ATTRIBUTES_T._CONFIRM" in FIGS. 7 to 10 according to ETSI Publication ETS 300175-3, October 1992, Section 7.2.5.3.8) or is still to be defined in the latter.

The second message "SWITCHING_CONFIRM" meets, for example, the request of the first telecommunication interface DIFS for a change of subsystem channel by confirming (positively answering) it.

However, it is also possible that the second telecommunication interface DIPS either deliberately or unintentionally (e.g. due to the fact that it has not received the first message due to a fault in the radio link) does not meet the request.

In a case where the request is deliberately not met, the first message "SWITCHING_REQUEST" will thus be rejected (answered negatively) either directly or indirectly, e.g. by exceeding a predetermined period of time for confirming the first message, by the second telecommunication interface DIPS.

Otherwise, the first message "SWITCHING_REQUEST" will be rejected (answered negatively) indirectly, e.g. by exceeding a predetermined period of time for confirming the first message.

In both the abovementioned cases, either the first message "SWITCHING_REQUEST" is retransmitted a predetermined number of times by the first telecommunication interface DIPS or the change of channel is aborted for an undetermined time.

The result of the transmission of the second message "SWITCHING_CONFIRM" is that the transmission of information is continued on the second subsystem channel $C_y$. Continuance can preferably take place on or after transmission of the message.

After or on receipt of the second message "SWITCHING_CONFIRM", the first telecommunication inter-face DIFS will preferably also delete the unconfirmed information transmitted on the first subsystem channel $C_x$ and incompletely received.

Before the information deleted by the first telecommunication interface DIFS and the second telecommunication interface DIPS is retransmitted on the second subsystem channel $C_y$, subsystem-specific parameters such as, for example, the backward transmission counter or timer specific to the DLC layer (compare ETSI Publication ETS 300175-4, October 1992, Section 9.2.5.7) and the $C_T$ packet number (compare ETSI Publication ETS 300175-3, October 1992, Section 7.1.2) are reset.

In addition, a test message which must be confirmed can be transmitted on the second subsystem channel $C_y$ before the information deleted by the first telecommunication inter-face DIFS and the second telecommunication interface DIPS is retransmitted. The test message is preferably the first DLC message "RECEIVE_READY" (compare ETSI Publication ETS 300175-4, October 1992, Section 7.11.2) sent as command whereas the confirmation of the test message is preferably the first DLC message "RECEIVE_READY" (compare ETSI Publication ETS 300175-4, October 1992, Section 7.11.2) sent as response.

Both the test message and the deleted information are preferably transmitted with the smallest possible window size according to the HDLC protocol, i.e. k=1, at the beginning (start phase of the transmission) in order to achieve rapid synchronization on the second subsystem channel $C_y$, and are then transmitted again with the window size k=3.

Figure 7:
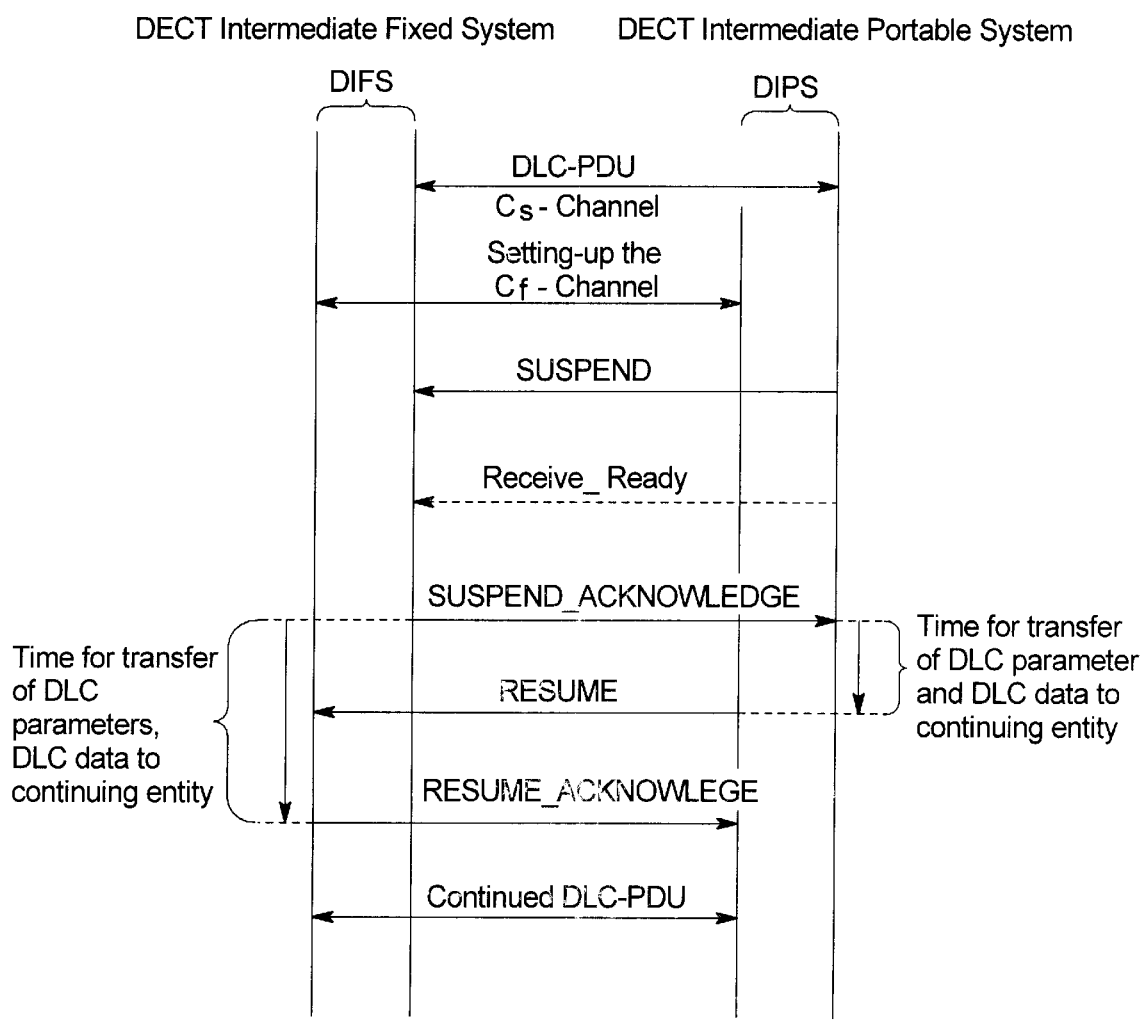
FIGS. 7–10 depict channel changes according to the present invention.

FIG. 7 shows a second event/state diagram which is based on FIG. 6 and which represents the control sequence for the change from a first subsystem channel $C_f$ to a second subsystem channel $C_s$.

The first subsystem channel $C_f$ is used for transmitting information on the C plane. The second subsystem channel $C_s$ is not used for transmitting information on the C plane. However, the U plane is utilized. The first subsystem channel $C_f$ has a higher transmission capacity than the second subsystem channel $C_s$.

The first telecommunication interface DIFS recognizes that the first subsystem channel $C_f$ is no longer necessary and sends a first MAC message "ATTRIBUTES_T._REQUEST" (compare ETSI Publication ETS 300175-3, October 1992, Section 7.2.5.3.8) to the second telecommunication interface DIPS.

The second telecommunication interface DIPS confirms the first MAC message "ATTRIBUTES_T._REQUEST" by sending a second MAC message "ATTRIBUTES_T._CONFIRM" to the first telecommunication interface DIFS. After that, the second subsystem channel $C_s$ is used for transmitting information on the C plane and the first subsystem channel $C_f$ is cleared by transmitting a third MAC message "RELEASE" (compare ETSI Publication ETS 300175-3, October 1992, Section 7.2.5.3.13).

Figure 8:
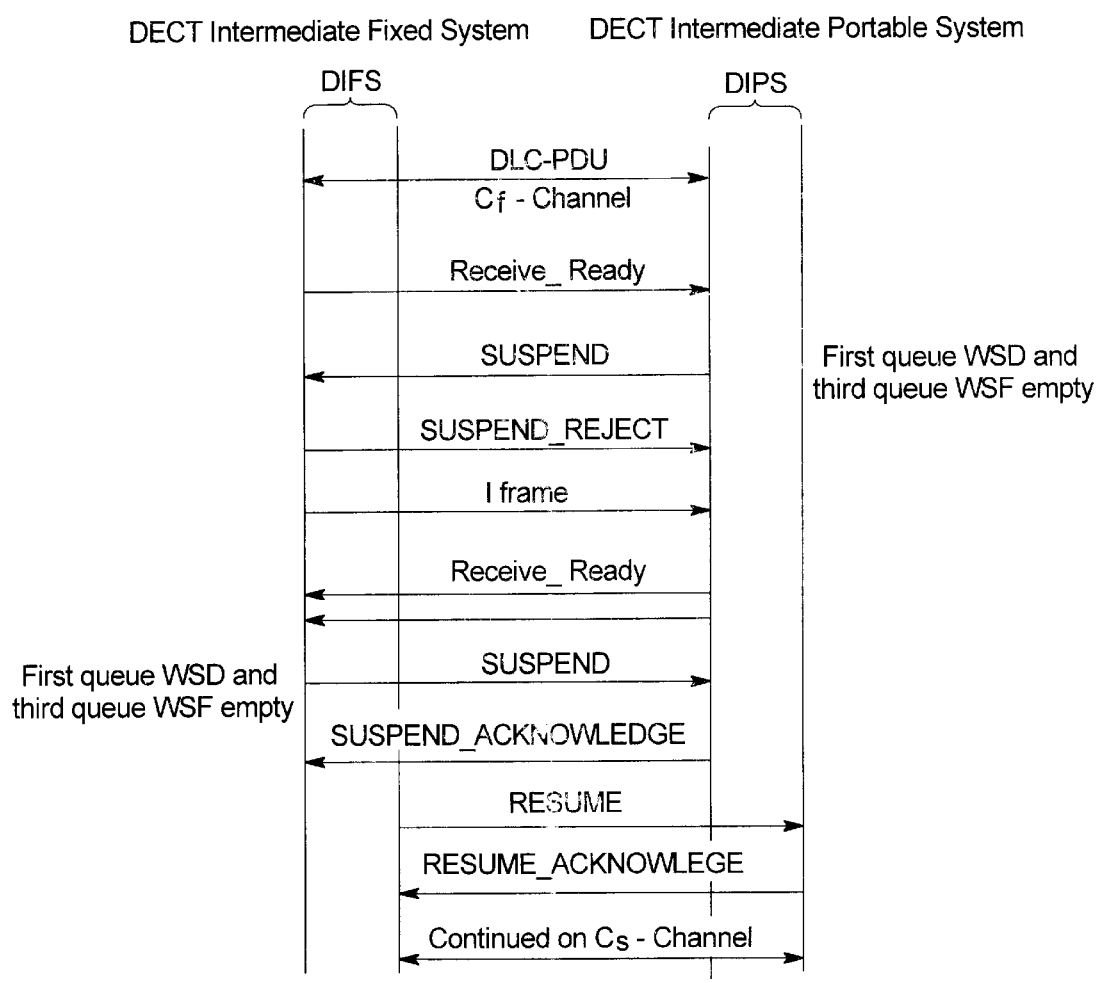

FIG. 8 shows a third event/state diagram based on FIG. 6, which represents the control sequence for the change from the second subsystem channel $C_s$ to a third subsystem channel $C_{s'}$.

The second subsystem $C_s$ is used for transmitting information on the C plane. In addition, the U plane is utilized. The third subsystem channel $C_{s'}$ is not used for transmitting information on the C plane but the U plane is utilized. The second subsystem channel $C_s$ has the same transmission capacity as the third subsystem channel $C_{s'}$.

The first telecommunication interface DIFS recognizes that the second subsystem channel $C_s$ is no longer necessary and sends the first MAC message "ATTRIBUTES_T._REQUEST" (compare ETSI Publication ETS 300175-3, October 1992, Section 7.2.5.3.8) to the second telecommunication interface DIPS.

The second telecommunication interface DIPS confirms the first MAC message "ATTRIBUTES_T._REQUEST" by sending the second MAC message "ATTRIBUTES_T._CONFIRM" to the first telecommunication interface DIFS. After that, the third subsystem channel $C_{s'}$ is used for transmitting information on the C plane and the second subsystem channel $C_s$ is cleared by transmitting the third MAC message "RELEASE" (compare ETSI Publication ETS 300175-3, October 1992, Section 7.2.5.3.13).

Figure 9:
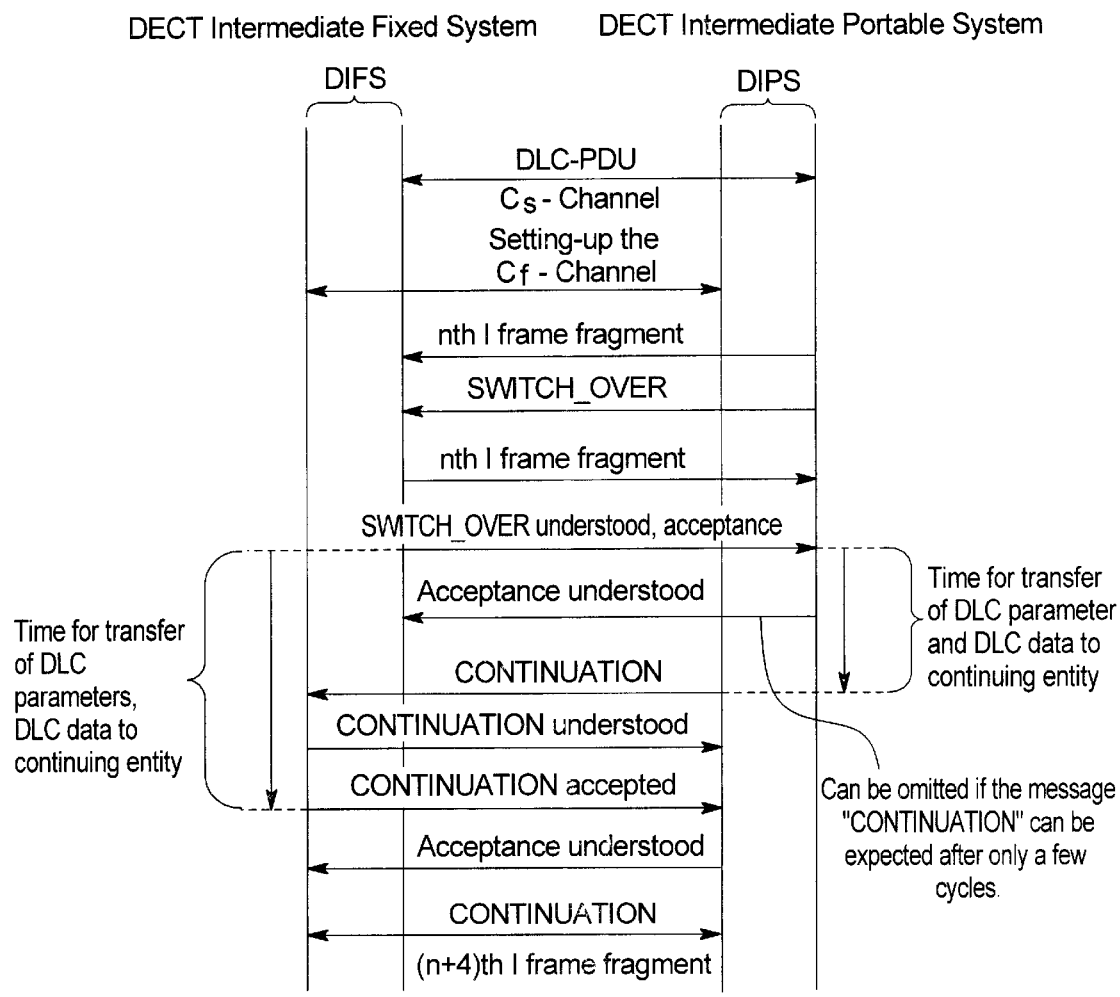

FIG. 9 shows a fourth event/state diagram based on FIG. 6, which represents the control sequence for the change from the second subsystem channel $C_s$ to the first subsystem channel $C_f$, the preparation for the change being initiated by the first telecommunication interface DIFS.

The second subsystem channel $C_s$ is used for transmitting information on the C plane. In addition, the U plane is utilized. A bearer having a logical connection number LCN for utilizing the first subsystem channel $C_f$ has not yet been set up. The second subsystem channel $C_s$ has a lower transmission capacity than the first subsystem channel $C_f$.

The first telecommunication interface DIFS recognizes that the first subsystem channel $C_f$ is needed. However, since there is as yet no bearer having the logical connection number LCN for the first subsystem channel $C_f$, the first telecommunication interface DIFS sends the first MAC message "ATTRIBUTES_T._REQUEST" to the second telecommunication interface DIPS (compare ETSI Publication ETS 300175-3, October 1992, Section 7.2.5.3.8). It informs the second telecommunication interface DIPS with this message about the need for a bearer having the logical connection number LCN, e.g. the logical connection number LCN0, for the first subsystem channel $C_f$.

The logical connection number LCN—in the present case LCN0—is not arbitrarily selected as identification for the bearer to be set up but deliberately in accordance with a predetermined selection criterion. Formulated, generally, this criterion consists in using as logical connection number LCN the logical connection number of the possible logical connection numbers LCN0, LCN1, LCN2 which is not yet being used for another bearer, that is to say is available.

As an alternative to the abovementioned selection criterion, it is also possible to use special features of the selection criterion for issuing the logical connection number. Thus it is possible—as in the present case—always to use, for example, the smallest available number of the logical connection numbers LCN0, LCN1, LCN2 or the largest available number of the logical connection numbers LCN0, LCN1, LCN2.

The second telecommunication interface DIPS which, according to the explanations in the description of FIG. 6 is preferably responsible for setting up a bearer (compare ETSI Publication ETS 300175-3, October 1992, Section 10.5.1.2 and 10.5.1.3), sends the DECT-specific first B-field message "BEARER_REQUEST" (compare ETSI Publication ETS 300175-3, October 1992, Section 7.3.3.2) as command to the first telecommunication interface DIFS. After receiving the first B-field message, the first telecommunication interface DIFS thereupon sends the DECT-specific second B-field message "BEARER_CONFIRM" (compare ETSI Publication ETS 300175-3, October 1992, Section 7.3.3.3) as response to the second telecommunication interface DIPS. In this state, i.e. after receipt of the second B-field message by the second telecommunication interface DIPS, the further bearer is set up (compare ETSI Publication ETS 300175-3, October 1992, Section 10.5.1.1 to 10.5.1.3).

After that, the first telecommunication interface DIFS sends the first MAC message "ATTRIBUTES_T._REQUEST" (compare ETSI Publication ETS 300175-3, October 1992, Section 7.2.5.3.8) to the second telecommunication interface DIPS.

The second telecommunication interface DIPS confirms the first MAC message "ATTRIBUTES_T._REQUEST" by sending the second MAC message "ATTRIBUTES_T._CONFIRM" to the first telecommunication interface DIFS. After that, the first subsystem channel $C_f$ is used for transmitting information on the C plane.

Figure 10:
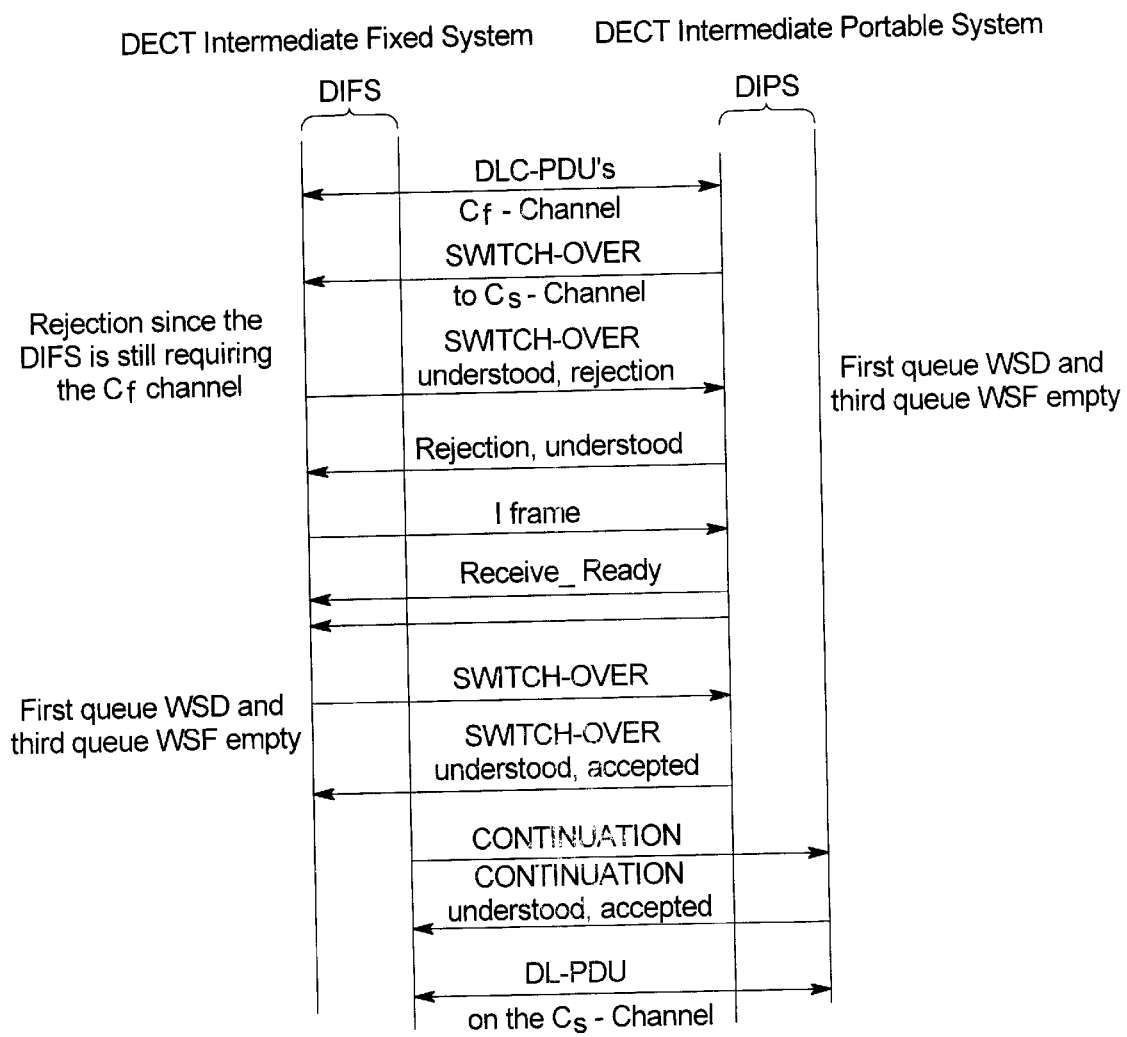

FIG. 10 shows a fifth event/state diagram based on FIG. 6, which represents the control sequence for the change from the second subsystem channel $C_s$ to the first subsystem channel $C_f$, the preparation for the change being initiated by the second telecommunication interface DIPS.

The second subsystem channel $C_s$ is used for transmitting information on the C plane, in addition, the U plane is utilized. A bearer having a logical connection number for utilising the first subsystem channel $C_f$ has not yet been set up. The second subsystem channel $C_s$ has a lower transmission capacity than the first subsystem channel $C_f$.

The second telecommunication interface DIFS recognizes that the first subsystem channel $C_f$ is necessary. However, since there is not yet a bearer having the logical connection number LCN, e.g. the logical connection number LCN0, for the first subsystem channel $C_f$, the latter is set up by it.

The logical connection number LCN—in the present case LCN0—is not arbitrarily selected as identification for the bearer to be set up but again deliberately in accordance with a predetermined selection criterion. Formulated, generally, this criterion consists in using the logical connection number of the possible logical connection numbers LCN0, LCN1, LCN2 which is not yet being used for another bearer, i.e. is available, as logical connection number LCN.

As an alternative to the abovementioned selection criterion, it is also possible to use special features of the selection criterion for issuing the logical connection number. Thus—as in the present case—for example the smallest available number of the logical connection numbers LCN0, LCN1, LCN2 or the largest available number of the logical connection numbers LCN0, LCN1, LCN2 can be used.

To set up the bearer, the second telecommunication interface DIPS, which is preferably responsible for setting up a bearer in accordance with the explanations in the description of FIG. 6, (compare ETSI Publication ETS 300175-3, October 1992, Section 10.5.1.2 and 10.5.1.3) sends the DECT-specific first B-field message "BEARER_REQUEST" (compare ETSI Publication ETS 300175-3, October 1992, Section 7.3.3.2) as command to the first telecommunication interface DIFS.

After having received the first B-field message, the first telecommunication interface DIFS thereupon sends the DECT-specific second B-field message "BEARER CONFIRM" (compare ETSI Publication ETS 300175-3, October 1992, Section 7.3.3.3) as response to the second telecommunication interface DIPS. In this state, i.e. after receipt of the second B-field message by the second telecommunication interface DIPS, the further bearer has been set up (compare ETSI Publication ETS 300175-3, October 1992, Section 10.5.1.1 to 10.5.1.3).

This is detected by the first telecommunication interface DIFS so that the latter sends the first MAC message "ATTRIBUTES_T._REQUEST" (compare ETSI Publication ETS 300175-3, October 1992, Section 7.2.5.3.8) to the second telecommunication interface DIPS.

The second telecommunication interface DIPS confirms the first MAC message "ATTRIBUTES_T._REQUEST" by sending the second MAC message "ATTRIBUTES_T._CONFIRM" to the first telecommunication interface DIFS. After that, the first subsystem channel $C_f$ is used for transmitting information on the C plane.

A second illustrative embodiment of the invention will be explained with reference to FIGS. 11 to 15.

Figure 11:
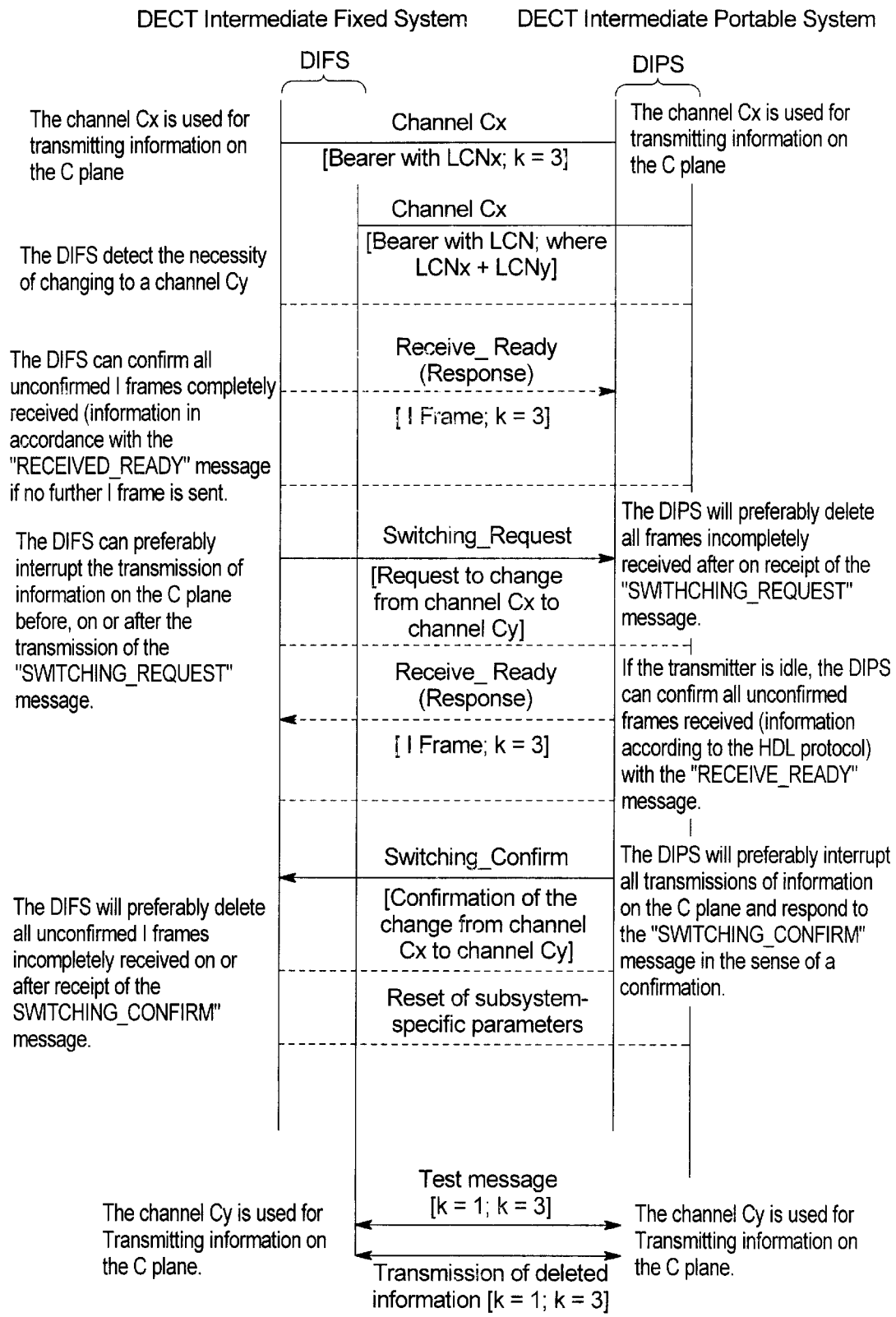
FIGS. 11–15 depict signal flow in the present invention.

FIG. 11 shows, on the basis of FIGS. 1 to 5, the basic configuration of a transmitting section and receiving section in each case for the first telecommunication interface DIFS and the second telecommunication interface DIPS, which is of significance for the analysis of the ISDN "layer-2/layer-3" messages and, respectively, the amount of information transmitted via these (compare printed document "Nachrichtentechnik Elektronik, Berlin 41, P2: (1991) Vol. 4, pages 138 to 143") on the "ISDN network-to-ISDN subscriber (Terminal Endpoint TE)" transmission link. Through the transmitting section and/or the receiving section, e.g. the first telecommunication interface DIFS and/or the second telecommunication interface DIPS detect(s) the necessity of producing a change of channel (change from one subsystem channel to another subsystem channel). At the same time, the result of the analysis forms the stimulus for the change of channel. In connection with the stimulation of the change of channel, the configuration of the transmitting section and receiving section shown in FIG. 11 can also be used for the first illustrative embodiment of thee invention.

In the transmitting section of the first telecommunication interface DIFS and, respectively, the second telecommunication interface DIPS, the NWK layer (Network Layer) transfers ISDN "layer-2/layer-3" information and DECT control information in familiar manner via a first queue WSD, constructed as buffer, to the DLC (Data Link Control) layer. A MAC/DLC controller STE of the transmitting section measures the loading in the queue WSD and stimulates from this the MAC (Medium Access Control) layer and DLC layer. As long as the loading remains below a threshold SD, the DLC layer deposits the information (message) to be transmitted in a second queue WSS, also constructed as a buffer, from which it transmits the MAC layer on the $C_s$ channel to the receiving section.

When the threshold SD is exceeded, the DLC layer deposits the information in a third queue WSF, again constructed as a buffer, from which it transmits the MAC layer to the receiving section on a $C_f$ channel which is set up for this purpose. The $C_s$ channel is used again when the first queue WSD and the third queue WSF are empty.

For the resultant change of channel between the $C_s$ channel and the $C_f$ channel, it is supposed that the $C_s$ channel-$C_f$ channel association in the first telecommunication interface DIFS and the second telecommunication interface DIPS is known, using the DECT standard. Like the $C_s$ channel, naturally, the $C_f$ channel can also be used for transmission in the opposite direction if it already exists.

The Operation in Detail

As long as the full ratio of the first queue WSD is below the threshold SD, the DLC layer uses the DECT A-field format (DECT standard) for feeding the second queue WSS. After the threshold SD has been exceeded, the third queue WSF is fed in the DECT B-field format. Switch-over to transmitting from the third queue WSF is done after the $C_f$ channel has been set up, when the second queue WSS is empty or the $C_f$ channel is ready.

There Are Two Possibilities for Changing from the A Format to the B Format a) The Queue WSS Only Contains Complete A-field DLC Frames Then, switching over is always done at DLC frame boundaries. There are three criteria for dimensioning the DLC frames:

shortest possible frames so that the delay of switch-over to transmitting from the third queue WSF remains as short as possible, on the other hand, the DLC PDU (Protocol Data Unit) data overhead rises when the maximum DLC frame length is not utilized, bridging the set-up time for the $C_f$ channel.

To control the $C_s$ channel-$C_f$ channel switch-over, DLC (Data Link Control) procedures are used.

Thus, e.g., the standard DECT procedures 37 Class B acknowledged suspension/Class B resumption" are used in modified form specifically for this application (compare DECT standard ETS 300175-4, October 1992, Section 9.2.7).

Figure 12:
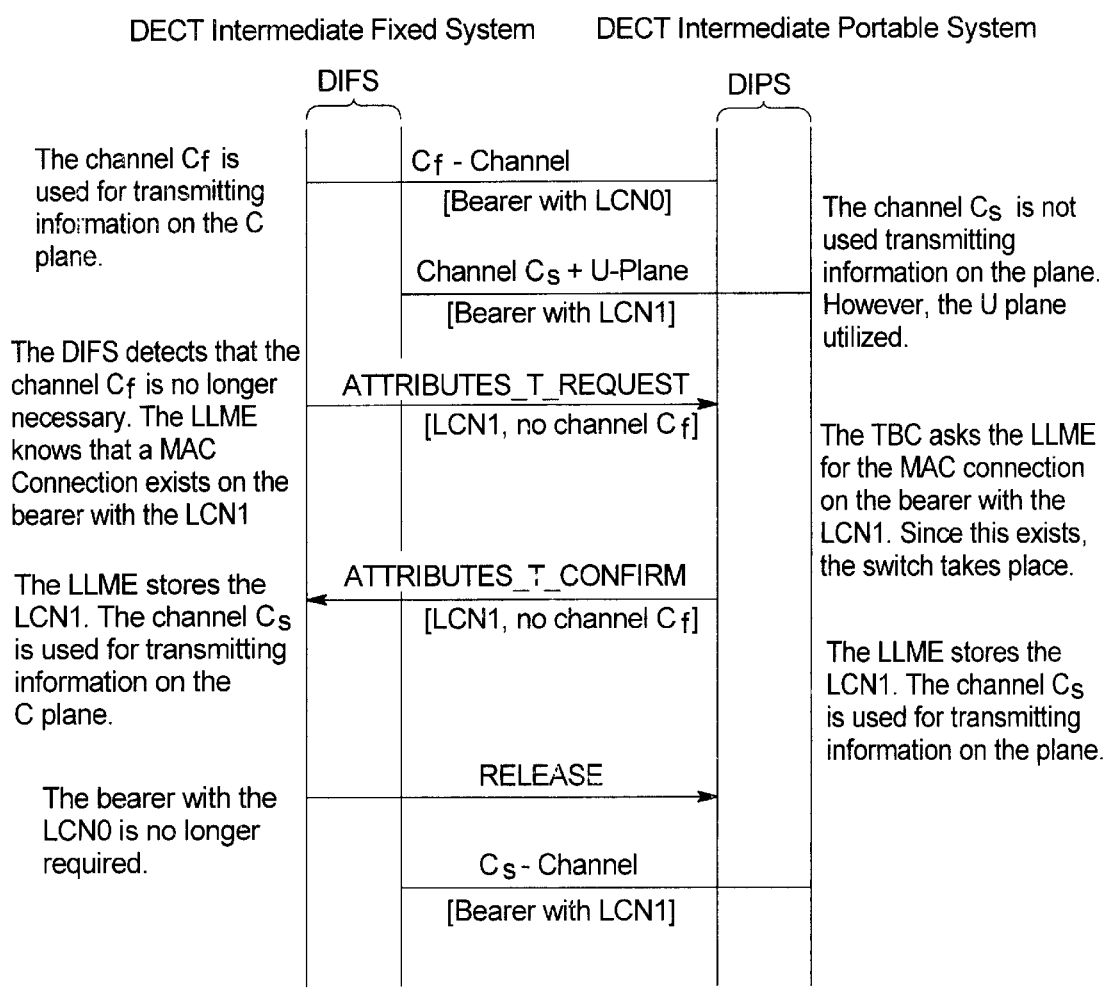

$C_s$ Channel–$C_f$ Channel According to FIG. 12

When the first queue WSS is empty, i.e. the last I frame has been acknowledged in accordance with the HDLC protocol, the initiating telecommunication interface DIFS, DIPS (e.g. the second telecommunication interface DIPS) sends a "SUSPEND" command on the $C_s$ channel. If the other station (the first telecommunication interface DIFS) itself still has to send I frames from the first queue WSS, it will terminate this as early as possible at the next frame boundary (remaining frames will be transferred to the third queue WSF), waits for the last acknowledgement on the $C_s$ channel and then accepts the "suspend" command on the $C_s$ channel.

After that, the second telecommunication interface DIPS initiates the resumption of the data link by a "RESUME" command on the $C_f$ channel. This is acknowledged on the $C_f$ channel by the first telecommunication interface DIFS. The two telecommunication interfaces DIFS, DIPS then continue the transmission on the $C_f$ channel.

Figure 13:
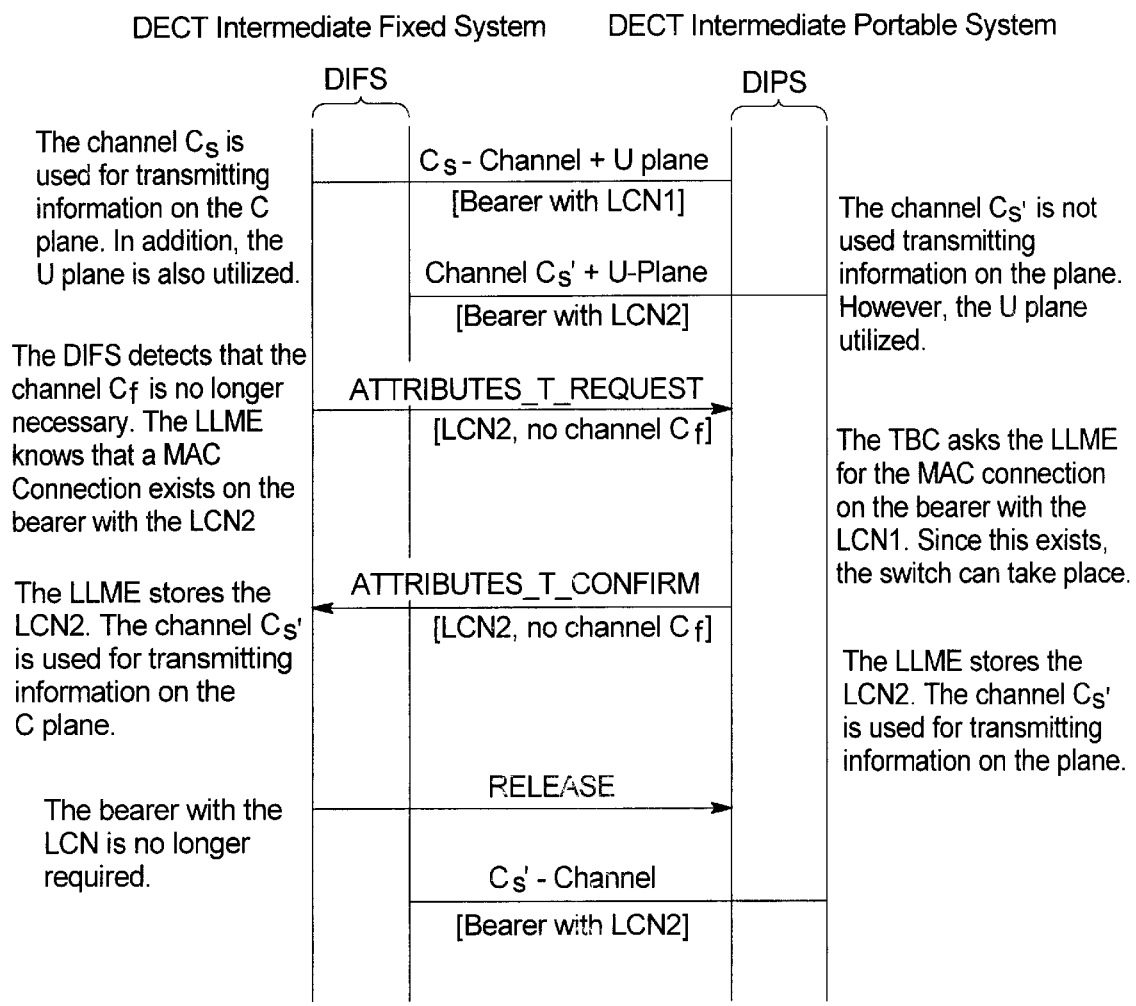

$C_f$ Channel–$C_s$ Channel According to FIG. 13

The channels are switched back when the first queue WSD and the third queue WSF on both sides are empty and the last I frame has been acknowledged.

A distinction is made between two cases:

The condition is met first at the telecommunication interface which has initiated the switch-over (the second telecommunication interface DIPS).

the second telecommunication interface DIPS sends the "SUSPEND" command on the $C_f$ channel.

the first telecommunication interface DIFS rejects the "SUSPEND" command on the $C_f$ channel and continues to transmit information on the $C_f$ channel.

thereafter, the first telecommunication interface DIFS also takes over the initiative for switch-over to the $C_s$ channel and, in turn, initiates the "suspension/resumption" when the $C_f$ channel is no longer needed. In the meantime, the second telecommunication interface DIPS could also spontaneously use the $C_f$ channel again if it needs to do so.

The condition at the telecommunication interface DIFS, DIPS, which has previously caused or retained the switch-over to the $C_f$ channel is met later.

This case ends the use of the $C_f$ channel and switches back to the $C_s$ channel.

In this case, the answering telecommunication interface DIFS, DIPS accepts the "suspension" on the $C_f$ channel. The suspending telecommunication interface DIFS, DIPS then initiates the "resumption" on the $C_s$ channel.

b) Switch-over within I Frames

This approach avoids the additional overheads for optimum DLC frames but presupposes that the $C_s$ channel–$C_f$ channel switch-over is gapless for the DLC layer and the precise point of switch-over is also detectable by the receiver.

The DLC layer in the transmitting section presets a frame length L after the start of a frame in the second queue WSS but must expect that it is necessary to switch over to the third queue WSF within the frame and that the frame must there be terminated in the B-field format. For this case, it stores L and all data already transferred to the second queue WSS and can use this to form the frame termination (fill octets, check sum) in accordance with B-field rules.

An expansion of the previously standardized functions of the MAC layer can be used for controlling the switch-over which is gapless for the DLC layer. This expansion affects the A-field as follows (see ETS 300175-3, 7.2.5, especially 7.2.5.3 et seq.).

In the MAC message header, one of the code points which is still free is occupied by the MAC command type "$C_s$ channel/$C_f$ channel switch-over".

The remainder of the A-field essentially contains the following information under this command:

Reference of the MAC connections between which the $C_s$ channel/$C_f$ channel switch-over is to take place (the ECN (Exchanged Connection Number) already defined is used).

Specific $C_s$ channel–$C_f$ channel/$C_f$ channel–$C_s$ channel switch-over command.

Acknowledgement: Switch-over accepted/not accepted, confirmation of the correct reception of the "acknowledgement" command.

Blank field (use wait function if acknowledgement is not immediately possible).

The B-field of the time slots containing these MAC control information either carries user information (U plane) if the $C_s$ channel is used, or the signalling information itself or, respectively, no information, if the $C_s$ channel is used.

Figure 14:
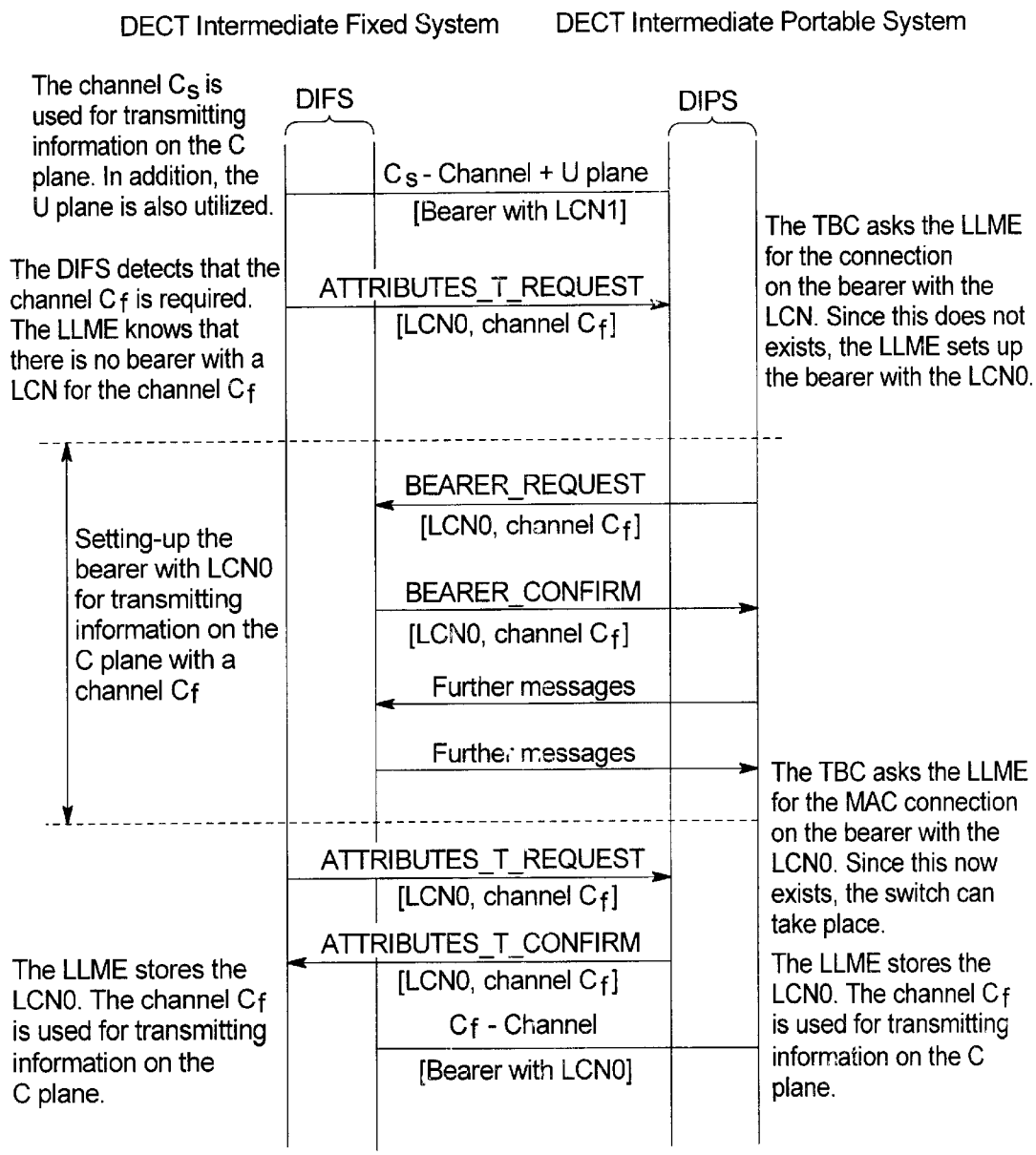

In the I frame, the switch-over proceeds in accordance with a similar arrangement to that above at point a):

$C_s$ Channel–$C_f$ Channel According to FIG. 14

After the MAC connection has been set up for the $C_f$ channel, the initiating telecommunication interface DIFS, DIPS sends, instead of an I frame segment, the $C_s$ channel–$C_f$ channel switch-over command, and on the $C_s$ channel. The other end acknowledges acceptance on the $C_s$ channel (there is no reason for rejection in this case). Both telecommunication interfaces DIFS, DIPS then continue the transmission on the $C_f$ channel.

Figure 15:
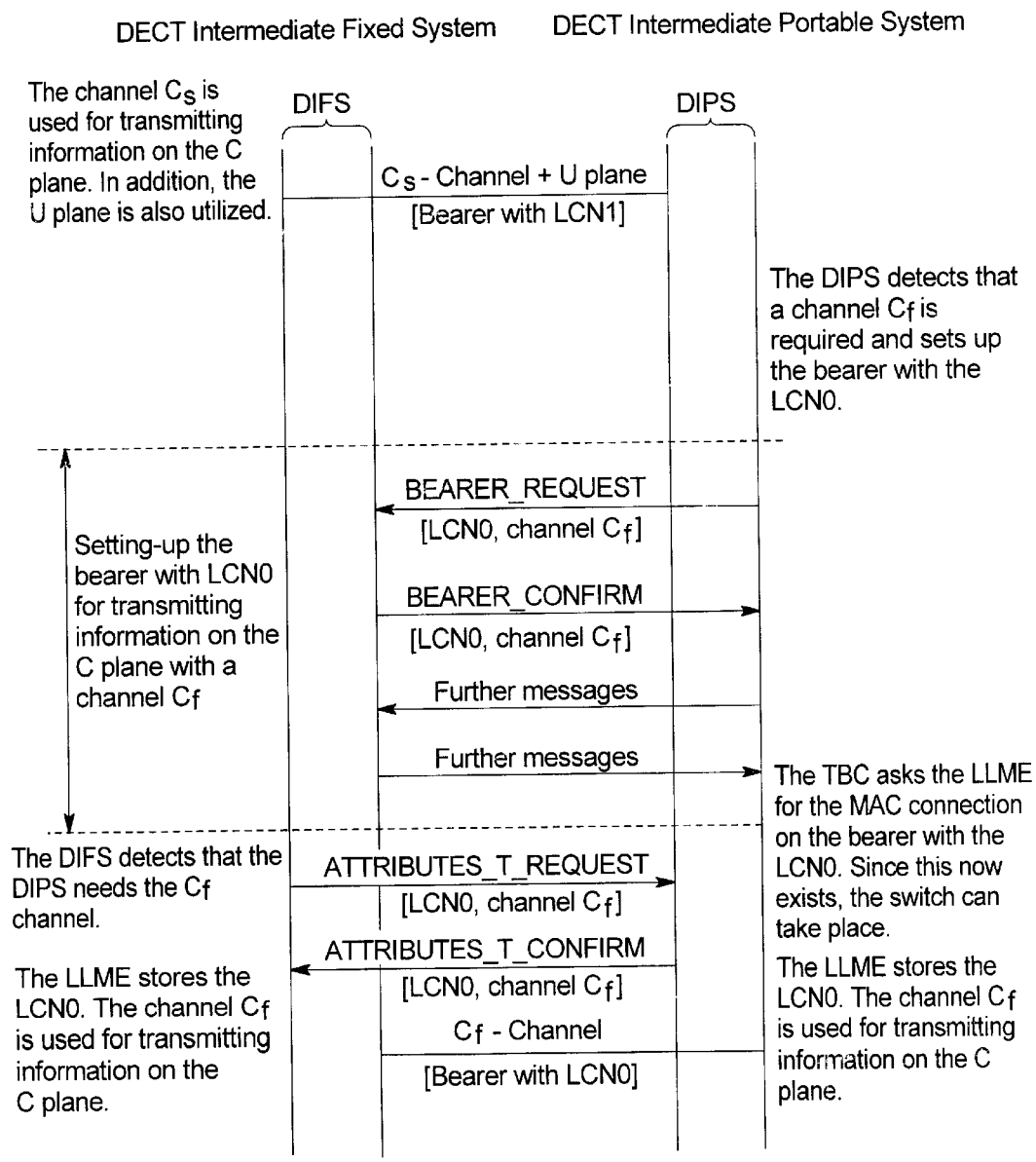

$C_f$ Channel–$C_s$ Channel According to FIG. 15

When the telecommunication interface DIFS, DIPS initiating the $C_f$ channel no longer needs this channel, it sends the $C_f$ channel–$C_s$ channel switch-over command on the $C_f$ channel. If the other end also no longer needs this channel at this time (WSD, WSF empty), it acknowledges the acceptance of the switch-back. Otherwise, it rejects the switch-back and thus, in turn, accepts the initiative for a new trigger of the switch-back if it no longer needs the $C_f$ channel. As long as the $C_f$ channel is active, it can also be used again by the other end.

Note

Naturally, the method can also be used at I frame boundaries.

There are then two possibilities:

MAC commands and acknowledgements are used, i.e. sent, at DLC frame boundaries.

MAC commands and acknowledgements are preventatively inserted already in current transmissions of DLC frames but the time of effectiveness is defined for DLC frame ends.

This results in the advantage of a gain in time because negotiations and possibly subsequent operations can already take place in parallel with an ongoing transmission.

Miscellaneous

According to DECT rules, the $C_f$ channel can be set up by both telecommunication interfaces DIFS, DIPS, if needed. Collisions in this case should lead to a common channel.

In the case of collision between set-up and clear-down, clear-down has priority.

The use of the $C_f$ channel can also be additionally stimulated by other criteria.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for controlling a changing of telecommunication channels of a telecommunication subsystem coupled into a telecommunication system as local information transmission loop, comprising the steps of:

a) transmitting system information in the telecommunication system;

b) allocating a plurality of subsystem channels for transmission of subsystem information and transmission of system information to the telecommunication subsystem;

c) allocating first and second telecommunication interfaces, that are connected to one another at least via a subsystem channel of the subsystem channels, to the telecommunication subsystem;

d) coupling the telecommunication subsystem into the telecommunication system via the first and second telecommunication interfaces;

e) transmitting information on the subsystem channel of the subsystem channels;

f) transmitting a switch-over command such that one of the first and second telecommunication interfaces signals to the other telecommunication interface that the information is to be transmitted on another subsystem channel of the subsystem channels;

g) transmitting a switch-over response by the telecommunication interface receiving the switch-over command-to the telecommunication interface sending the switch-over command; and h) interrupting the transmission of the information before, with or after the transmission of the switch-over command and resuming the transmission of the information with or after the transmission of the switch-over response;

wherein the transmission of the information is interrupted immediately after the transmission of the switch-over command and wherein the switch-over response is transmitted substantially immediately after the transmission of the switch-over command.

2. The method according to claim 1, wherein the transmission of the information is interrupted by the telecommunication interface sending the switch-over command immediately after the transmission of the switch-over command, wherein the transmission of the information is interrupted by the telecommunication interface receiving the switch-over command substantially immediately after the transmission of the switch-over command when an integral information packet has been terminally transmitted by the telecommunication interface receiving the switch-over command and wherein the switch-over response is transmitted substantially immediately after the transmission of the information packet.

3. The method according to claim 1, wherein transmission of the information is interrupted by the telecommunication interface sending the switch-over command immediately after the transmission of the switch-over command, wherein the transmission of the information is interrupted by the telecommunication interface receiving the switch-over command after a predetermined period of time, to acknowledge information already received, substantially immediately after the transmission of the switch-over command, and wherein the switch-over response is transmitted substantially immediately after the transmission of the acknowledgment.

4. The method according to claim 1, wherein one of a PHS system, a WACS system or a PACS system is employed as the telecommunication subsystem.

5. The method according to claim 1, wherein one of a "IS-54" system or a PDC system is employed as the telecommunication subsystem.

6. A method for controlling a changing of telecommunication channels of a telecommunication subsystem coupled into a telecommunication system as local information transmission loop, comprising the steps of:
   a) transmitting system information in the telecommunication system;
   b) allocating a plurality of subsystem channels for transmission of subsystem information and transmission of system information to the telecommunication subsystem;
   c) allocating first and second telecommunication interfaces, that are connected to one another at least via a subsystem channel of the subsystem channels, to the telecommunication subsystem;
   d) coupling the telecommunication subsystem into the telecommunication system via the first and second telecommunication interfaces;
   e) transmitting information on the subsystem channel of the subsystem channels;
   f) transmitting a switch-over command such that one of the first and second telecommunication interfaces signals to the other telecommunication interface that the information is to be transmitted on another subsystem channel of the subsystem channels;
   g) transmitting a switch-over response by the telecommunication interface receiving the switch-over command to the telecommunication interface sending the switch-over command; and
   h) interrupting the transmission of the information before, with or after the transmission of the switch-over command and resuming the transmission of the information with or after the transmission of the switch-over response;
   wherein the transmission of the information is interrupted by the telecommunication interface sending the switch-over command immediately after the transmission of the switch-over command, wherein the transmission of the information is interrupted by the telecommunication interface receiving the switch-over command substantially immediately after the transmission of the switch-over command when an integral information packet has been terminally transmitted by the telecommunication interface receiving the switch-over command and wherein the switch-over response is transmitted substantially immediately after the transmission of the information packet.

7. The method according to claim 6, wherein the transmission of the information is interrupted immediately after the transmission of the switch-over command and wherein the switch-over response is transmitted substantially immediately after the transmission of the switch-over command.

8. The method according to claim 6, wherein transmission of the information is interrupted by the telecommunication interface sending the switch-over command immediately after the transmission of the switch-over command, wherein the transmission of the information is interrupted by the telecommunication interface receiving the switch-over command after a predetermined period of time, to acknowledge information already received, substantially immediately after the transmission of the switch-over command, and wherein the switch-over response is transmitted substantially immediately after the transmission of the acknowledgment.

9. The method according to claim 6, wherein one of a PHS system, a WACS system or a PACS system is employed as the telecommunication subsystem.

10. The method according to claim 6, wherein one of a "IS-54" system or a PDC system is employed as the telecommunication subsystem.

11. A method for controlling a changing of telecommunication channels of a telecommunication subsystem coupled into a telecommunication system as local information transmission loop, comprising the steps of:
   a) transmitting system information in the telecommunication system;
   b) allocating a plurality of subsystem channels for transmission of subsystem information and transmission of system information to the telecommunication subsystem;
   c) allocating first and second telecommunication interfaces, that are connected to one another at least via a subsystem channel of the subsystem channels, to the telecommunication subsystem;
   d) coupling the telecommunication subsystem into the telecommunication system via the first and second telecommunication interfaces;
   e) transmitting information on the subsystem channel of the subsystem channels;
   f) transmitting a switch-over command such that one of the first and second telecommunication interfaces signals to the other telecommunication interface that the information is to be transmitted on another subsystem channel of the subsystem channels;
   g) transmitting a switch-over response by the telecommunication interface receiving the switch-over command to the telecommunication interface sending the switch-over command; and
   h) interrupting the transmission of the information before, with or after the transmission of the switch-over command and resuming the transmission of the information with or after the transmission of the switch-over response;
   wherein transmission of the information is interrupted by the telecommunication interface sending the switch-over command immediately after the transmission of the switch-over command, wherein the transmission of the information is interrupted by the telecommunication interface receiving the switch-over command after a predetermined period of time, to acknowledge information already received, substantially immediately after the transmission of the switch-over command, and wherein the switch-over response is transmitted substantially immediately after the transmission of the acknowledgment.

12. The method according to claim 11, wherein the transmission of the information is interrupted immediately after the transmission of the switch-over command and wherein the switch-over response is transmitted substantially immediately after the transmission of the switch-over command.

13. The method according to claim 11, wherein the transmission of the information is interrupted by the telecommunication interface sending the switch-over command immediately after the transmission of the switch-over command, wherein the transmission of the information is interrupted by the telecommunication interface receiving the switch-over command substantially immediately after the transmission of the switch-over command when an integral information packet has been terminally transmitted by the telecommunication interface receiving the switch-over command and wherein the switch-over response is transmitted substantially immediately after the transmission of the information packet.

14. The method according to claim 11, wherein one of a PHS system, a WACS system or a PACS system is employed as the telecommunication subsystem.

15. The method according to claim 11, wherein one of a "IS-54" system or a PDC system is employed as the telecommunication subsystem.

16. A method for controlling a changing of telecommunication channels of a telecommunication subsystem coupled into a telecommunication system as local information transmission loop, comprising the steps of:
  a) transmitting system information in the telecommunication system;
  b) allocating a plurality of subsystem channels for transmission of subsystem information and transmission of system information to the telecommunication subsystem;
  c) allocating first and second telecommunication interfaces, that are connected to one another at least via a subsystem channel of the subsystem channels, to the telecommunication subsystem;
  d) coupling the telecommunication subsystem into the telecommunication system via the first and second telecommunication interfaces;
  e) transmitting information on the subsystem channel of the subsystem channels;
  f) transmitting a switch-over command such that one of the first and second telecommunication interfaces signals to the other telecommunication interface that the information is to be transmitted on another subsystem channel of the subsystem channels;
  g) transmitting a switch-over response by the telecommunication interface receiving the switch-over command to the telecommunication interface sending the switch-over command; and
  h) transmitting the information according to a predetermined transmission principle with a predetermined transmission sequence and transmitting the information, after a channel change, are transmitted on the other subsystem channel with an optimally small transmission sequence;
  wherein the principle of transmission with the predetermined window is an HDLC protocol for transmitting HDLC frames.

17. The method according to claim 16, wherein one of a PHS system, a WACS system or a PACS system is employed as the telecommunication subsystem.

18. The method according to claim 16, wherein one of a "IS-54" system or a PDC system is employed as the telecommunication subsystem.

19. A method for controlling a changing of telecommunication channels of a telecommunication subsystem coupled into a telecommunication system as local information transmission loop, comprising the steps of:
  a) transmitting system information in the telecommunication system;
  b) allocating a plurality of subsystem channels for transmission of subsystem information and transmission of system information to the telecommunication subsystem;
  c) allocating first and second telecommunication interfaces that are connected to one another at least via a subsystem channel of the subsystem channels to the telecommunication subsystem;
  d) coupling the telecommunication subsystem into the telecommunication system via the first and second telecommunication interfaces;
  e) transmitting information on the subsystem channel of the subsystem channels;
  f) transmitting a switch-over command such that one of the first and second telecommunication interfaces signals to the other telecommunication interface that the information is to be transmitted on another subsystem channel of the subsystem channels;
  g) transmitting a switch-over response by the telecommunication interface receiving the switch-over command to the telecommunication interface sending the switch-over command; and
  h) analyzing the information to be transmitted in the telecommunication subsystem by at least one of the first and second telecommunication interfaces, a result of the analyzing effecting a transmission of the switch-over command;
  wherein at least one of system messages with user information, the system information and the subsystem information are transmitted on bearers having different logical connection numbers between the telecommunication interfaces of the telecommunication subsystem;
  wherein a first logical connection number which is not occupied by other bearers is allocated to a first bearer to which a first subsystem channel is allocated.

20. The method according to claim 19, wherein the first logical connection is a smallest issuable logical connection number of the logical connection numbers identifying the bearers.

21. The method according to claim 19, wherein the first logical connection is a largest issuable logical connection number of the logical connection numbers identifying the bearers.

22. The method according to claim 19, wherein the first subsystem channel is wider than a second subsystem channel with respect to transmission capacity, wherein the first subsystem channel is allocated 10 to the first bearer with the first logical connection number and the second subsystem channel is allocated to a second bearer having a second logical connection number and wherein a change from the first subsystem channel to the second subsystem channel is effected by the following:
  a) that a switch-over command is transmitted by the first telecommunication interface to the second telecommunication interface, such that the first telecommunication interface signals to the second telecommunication interface that the information is to be transmitted on the second subsystem channel,
  b) that a switch-over response is transmitted by the second telecommunication interface to the first telecommunication interface.

23. The method according to claim 19, wherein a second subsystem channel is identical to a third subsystem channel with respect to transmission capacity, wherein the second subsystem channel is allocated to a second bearer having a second logical connection number and the third subsystem channel is allocated to a third bearer having a third logical connection number and wherein the change from the second subsystem channel to the third subsystem channel is effected by the following:

a) that a switch-over command is transmitted by the first telecommunication interface to the second telecommunication interface, such that the first telecommunication interface signals to the second telecommunication interface that the information is to be transmitted on the second subsystem channel, b) that a switch-over response is transmitted by the second telecommunication interface to the first telecommunication interface.

24. The method according to claim 19, wherein the first subsystem channel is wider than a second subsystem channel with respect to transmission capacity, wherein the second subsystem channel is allocated to a second bearer having a second logical connection number, wherein the first bearer having the first logical connection number is set up for the first subsystem channel and wherein a change from the second subsystem channel to the first subsystem channel is effected by the following:

a) that a switch-over command is transmitted by the first telecommunication interface to the second telecommunication interface, such that the first telecommunication interface signals to the second telecommunication interface that the information is to be transmitted on the second subsystem channel, b) that a switch-over response is transmitted by the second telecommunication interface to the first telecommunication interface.

25. The method according to claim 26, wherein a setting-up of the first bearer having the first logical connection number for the first subsystem channel is triggered by the first telecommunication interface.

26. The method according to claim 24, wherein a setting-up of the first bearer having the first logical connection number for the first subsystem channel is triggered by the second telecommunication interface.

27. The method according to claim 19, wherein one of a PHS system, a WACS system or a PACS system is employed as the telecommunication subsystem.

28. The method according to claim 19, wherein one of a "IS-54" system or a PDC system is employed as the telecommunication subsystem.

29. A method for controlling a changing of telecommunication channels of a telecommunication subsystem coupled into a telecommunication system as local information transmission loop, comprising the steps of:

a) transmitting system information in the telecommunication system;

b) allocating a plurality of subsystem channels for transmission of subsystem information and transmission of system information to the telecommunication subsystem;

c) allocating first and second telecommunication interfaces that are connected to one another at least via a subsystem channel of the subsystem channels to the telecommunication subsystem;

d) coupling the telecommunication subsystem into the telecommunication system via the first and second telecommunication interfaces;

e) transmitting information on the subsystem channel of the subsystem channels;

f) transmitting a switch-over command such that one of the first and second telecommunication interfaces signals to the other telecommunication interface that the information is to be transmitted on another subsystem channel of the subsystem channels;

g) transmitting a switch-over response by the telecommunication interface receiving the switch-over command to the telecommunication interface sending the switch-over command; and h) analyzing the information to be transmitted in the telecommunication subsystem by at least one of the first and second telecommunication interfaces, a result of the analyzing effecting a transmission of the switch-over command;

wherein one of a PHS system, a WACS system or a PACS system is employed as the telecommunication subsystem.

30. A method for controlling a changing of telecommunication channels of a telecommunication subsystem coupled into a telecommunication system as local information transmission loop, comprising the steps of:

a) transmitting system information in the telecommunication system;

b) allocating a plurality of subsystem channels for transmission of subsystem information and transmission of system information to the telecommunication subsystem;

c) allocating first and second telecommunication interfaces that are connected to one another at least via a subsystem channel of the subsystem channels to the telecommunication subsystem;

d) coupling the telecommunication subsystem into the telecommunication system via the first and second telecommunication interfaces;

e) transmitting information on the subsystem channel of the subsystem channels;

f) transmitting a switch-over command such that one of the first and second telecommunication interfaces signals to the other telecommunication interface that the information is to be transmitted on another subsystem channel of the subsystem channels;

g) transmitting a switch-over response by the telecommunication interface receiving the switch-over command to the telecommunication interface sending the switch-over command; and h) analyzing the information to be transmitted in the telecommunication subsystem by at least one of the first and second telecommunication interfaces, a result of the analyzing effecting a transmission of the switch-over command;

wherein one of a "IS-54" system or a PDC system is employed as the telecommunication subsystem.

* * * * *